United States Patent
Hidaka et al.

(10) Patent No.: US 11,390,353 B2
(45) Date of Patent: Jul. 19, 2022

(54) OPERATING DEVICE FOR HUMAN-POWERED VEHICLE

(71) Applicant: SHIMANO INC., Sakai (JP)

(72) Inventors: Yuichiro Hidaka, Sakai (JP); Takuma Sakai, Sakai (JP); Yasuyuki Komada, Sakai (JP); Shun Kakehashi, Sakai (JP)

(73) Assignee: SHIMANO INC., Sakai (JP)

( * ) Notice: Subject to any disclaimer, the term of this patent is extended or adjusted under 35 U.S.C. 154(b) by 47 days.

(21) Appl. No.: 16/864,169

(22) Filed: May 1, 2020

(65) Prior Publication Data

US 2021/0339819 A1 Nov. 4, 2021

(51) Int. Cl.
*B62K 23/06* (2006.01)
*B62K 21/16* (2006.01)

(52) U.S. Cl.
CPC .............. *B62K 23/06* (2013.01); *B62K 21/16* (2013.01)

(58) Field of Classification Search
CPC ........ B62K 23/06; B62K 21/16; B62M 25/04; B62M 25/045; B62M 25/08
See application file for complete search history.

(56) References Cited

U.S. PATENT DOCUMENTS

| | | | | |
|---|---|---|---|---|
| 7,793,565 | B2* | 9/2010 | Orrico | B62L 3/02 74/502.2 |
| 8,869,649 | B2* | 10/2014 | Miki | B62J 99/00 74/501.6 |
| 8,905,205 | B2* | 12/2014 | Matsushita | B62K 23/06 188/344 |
| 9,821,871 | B2* | 11/2017 | Feuerstein | B62K 21/26 |
| 2006/0070480 | A1* | 4/2006 | Fujii | B62M 25/08 74/502.2 |
| 2011/0138961 | A1 | 6/2011 | Dal Pra | |
| 2018/0304960 | A1* | 10/2018 | Komada | B62K 23/06 |
| 2019/0210691 | A1 | 7/2019 | Chan et al. | |

FOREIGN PATENT DOCUMENTS

| | | |
|---|---|---|
| EP | 1964760 A1 | 9/2008 |
| EP | 2062809 B1 | 5/2019 |

\* cited by examiner

*Primary Examiner* — Thomas C Diaz
(74) *Attorney, Agent, or Firm* — Mori & Ward, LLP

(57) ABSTRACT

An operating device for a human-powered vehicle comprises a base member and an operating member. The base member extends in a longitudinal direction. The base member includes a first end portion and a second end portion. The second end portion includes a cover portion provided on a reverse side of the first end portion in the longitudinal direction. The operating member includes an outer surface configured to face away from the first end portion in a rest state where the operating member is in a rest position. The cover portion is configured to be arranged on a pivotal movement track of the operating member so as to at least partly overlap with the outer surface of the operating member in the rest state as viewed in the longitudinal direction.

20 Claims, 23 Drawing Sheets

OPERATING DEVICE FOR HUMAN-POWERED VEHICLE

BACKGROUND OF THE INVENTION

Field of the Invention

The present invention relates to an operating device for a human-powered vehicle.

Discussion of the Background

A human-powered vehicle includes an operating unit configured to operate an operated unit.

SUMMARY OF THE INVENTION

In accordance with a first aspect of the present invention, an operating device for a human-powered vehicle comprises a base member and an operating member. The base member extends in a longitudinal direction. The base member includes a first end portion and a second end portion. The first end portion is configured to be coupled to a handlebar. The second end portion is opposite to the first end portion in the longitudinal direction. The second end portion includes a cover portion provided on a reverse side of the first end portion in the longitudinal direction. The operating member is pivotally coupled to the base member about a pivot axis between a rest position and an operated position. The operating member includes an outer surface configured to face away from the first end portion in a rest state where the operating member is in the rest position. The cover portion is configured to be arranged on a pivotal movement track of the operating member so as to at least partly overlap with the outer surface of the operating member in the rest state as viewed in the longitudinal direction.

With the operating device according to the first aspect, it is possible to restrict the operating member from receiving such force that the operating member in an opposite direction from the rest position. Thus, it is possible to operate the operating member from the rest position toward the operated position even when the rider's hand applies force to the cover portion of the base member.

In accordance with a second aspect of the present invention, an operating device for a human-powered vehicle comprises a base member and an operating member. The base member extends in a longitudinal direction. The base member includes a first end portion and a second end portion. The first end portion is configured to be coupled to a handlebar. The second end portion is opposite to the first end portion in the longitudinal direction. The second end portion includes a cover portion provided on a reverse side of the first end portion in the longitudinal direction. The operating member is pivotally coupled to the base member about a pivot axis between a rest position and an operated position. The operating member includes an outer surface configured to face away from the first end portion in a rest state where the operating member is in the rest position. The cover portion has a curved shape as viewed along the pivot axis.

With the operating device according to the second aspect, the curved shape can make the cover portion fit for the rider's finger, easily graspable by the rider's finger, and/or firmly held by the rider's finger.

In accordance with a third aspect of the present invention, the operating device according to the second aspect is configured so that the curved shape of the cover portion is concave toward the first end portion as viewed along the pivot axis.

With the operating device according to the third aspect, the curved shape can make the cover portion fitter for the rider's finger.

In accordance with a fourth aspect of the present invention, the operating device according to the third aspect is configured so that the curved shape is configured to position a rider's finger.

With the operating device according to the fourth aspect, it is possible to make the rider's hand stable relative to the operating device.

In accordance with a fifth aspect of the present invention, an operating device for a human-powered vehicle comprises a base member and an operating member. The base member extends in a longitudinal direction. The base member includes a first end portion and a second end portion. The first end portion is configured to be coupled to a handlebar. The second end portion is opposite to the first end portion in the longitudinal direction. The second end portion includes a cover portion provided on a reverse side of the first end portion in the longitudinal direction. The operating member is pivotally coupled to the base member about a pivot axis between a rest position and an operated position. The operating member includes an outer surface configured to face away from the first end portion so as to at least partly overlap with the cover portion in a rest state where the operating member is in the rest position as viewed in a longitudinal direction. The base member includes a main body provided between the first end portion and the second end portion and an attachment member to which the cover portion of the second end portion is provided. The attachment member is made of a first material different from the main body.

With the operating device according to the fifth aspect, it is possible to improve flexibility of choosing materials of the attachment member and the main body.

In accordance with a sixth aspect of the present invention, the operating device according to the fifth aspect is configured so that the first material includes a glass fiber reinforced material.

With the operating device according to the sixth aspect, it is possible to improve strength of the attachment member.

In accordance with a seventh aspect of the present invention, the operating device according to the fifth or sixth aspect is configured so that the main body is made of a second material different from the first material.

With the operating device according to the seventh aspect, it is possible to improve flexibility of choosing materials of the attachment member and the main body.

In accordance with an eighth aspect of the present invention, the operating device according to the seventh aspect is configured so that the second material includes a carbon fiber reinforced material.

With the operating device according to the eighth aspect, it is possible to improve strength of the main body.

In accordance with a ninth aspect of the present invention, the operating device according to any one of the first to eighth aspects is configured so that a clearance is provided between the base member and the outer surface of the operating member in the rest state.

With the operating device according to the ninth aspect, the clearance can reliably restrict the operating member from receiving such force that the operating member in an opposite direction from the rest position.

In accordance with a tenth aspect of the present invention, the operating device according to the ninth aspect is configured so that the clearance is provided between the base member and the outer surface of the operating member in the longitudinal direction in the rest state such that the operating member is pivotally moved with respect to the base member between the rest position and the operated position.

With the operating device according to the tenth aspect, the clearance can more reliably restrict the operating member from receiving such force that the operating member in an opposite direction from the rest position.

In accordance with an eleventh aspect of the present invention, the operating device according to any one of the first to tenth aspects is configured so that the outer surface is provided between the pivot axis and the cover portion of the base member in the rest state.

With the operating device according to the eleventh aspect, it is possible to reliably restrict the operating member from receiving such force that the operating member in an opposite direction from the rest position.

In accordance with a twelfth aspect of the present invention, the operating device according to the eleventh aspect is configured so that the outer surface is provided between the pivot axis and the cover portion in the longitudinal direction in the rest state.

With the operating device according to the twelfth aspect, it is possible to more reliably restrict the operating member from receiving such force that the operating member in an opposite direction from the rest position.

In accordance with a thirteenth aspect of the present invention, the operating device according to any one of the first to twelfth aspects is configured so that the operating member includes a proximal end portion and a distal end portion opposite to the proximal end portion. The proximal end portion is closer to the pivot axis than the distal end portion. The cover portion includes a lowermost end. The outer surface includes an uppermost end. The lowermost end of the cover portion is closer to the distal end portion of the operating member than the uppermost end of the outer surface in the rest state.

With the operating device according to the thirteenth aspect, it is possible to reliably restrict the operating member from receiving such force that the operating member in an opposite direction from the rest position.

In accordance with a fourteenth aspect of the present invention, the operating device according to the thirteenth aspect is configured so that the base member includes an upper surface and a lower surface. The upper surface defines an upper reference line extending along the longitudinal direction. The lower surface defines a lower reference line extending along the longitudinal direction. A first distance from the upper reference line to the lowermost end in a perpendicular direction perpendicular to the longitudinal direction is larger than a second distance from the lower reference line to the lowermost end in the perpendicular direction.

With the operating device according to the fourteenth aspect, it is possible to more reliably restrict the operating member from receiving such force that the operating member in an opposite direction from the rest position.

In accordance with a fifteenth aspect of the present invention, the operating device according to the fourteenth aspect is configured so that the lowermost end is closer to the distal end portion of the operating member than the pivot axis in the rest state in the perpendicular direction perpendicular to the longitudinal direction.

With the operating device according to the fifteenth aspect, it is possible to more reliably restrict the operating member from receiving such force that the operating member in an opposite direction from the rest position.

In accordance with a sixteenth aspect of the present invention, the operating device according to the fourteenth or fifteenth aspect is configured so that the second end portion includes a lateral surface and an additional lateral surface provided on a reverse side of the lateral surface in an axial direction of the pivot axis. The second end portion has an asymmetrical shape with respect to a transverse center plane of the second end portion, the transverse center plane being defined to bisect a transverse length defined between the lateral surface and the additional lateral surface.

With the operating device according to the sixteenth aspect, it is possible to make the operating device fit for the rider's left or right hand.

In accordance with a seventeenth aspect of the present invention, the operating device according to the sixteenth aspect is configured so that a transverse center of the lowermost end is offset from the transverse center plane of the second end portion toward one of the lateral surface and the additional lateral surface.

With the operating device according to the seventeenth aspect, it is possible to make the operating device fitter for the rider's left or right hand.

In accordance with an eighteenth aspect of the present invention, the operating device according to the seventeenth aspect is configured so that the transverse center of the lowermost end is closer to a handlebar center plane than the transverse center plane in a mounting state where the first end portion is coupled to the handlebar. The handlebar center plane bisects a transverse length of the handlebar.

With the operating device according to the eighteenth aspect, it is possible to reliably make the operating device fitter for the rider's left or right hand.

In accordance with a nineteenth aspect of the present invention, the operating device according to any one of the first to eighteenth aspects is configured so that the second end portion includes a lateral surface and an additional lateral surface provided on a reverse side of the lateral surface in an axial direction of the pivot axis. The second end portion has an asymmetrical shape with respect to a transverse center plane of the second end portion, the transverse center plane being defined to bisect a lateral length defined between the lateral surface and the additional lateral surface.

With the operating device according to the nineteenth aspect, it is possible to make the operating device fit for the rider's left or right hand.

In accordance with a twentieth aspect of the present invention, the operating device according to any one of the first to nineteenth aspects is configured so that at least one of a power supply and circuitry is at least partly provided at the second end portion.

With the operating device according to the twentieth aspect, it is possible to utilize the second end portion as a place for the at least one of the power supply and the circuitry.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
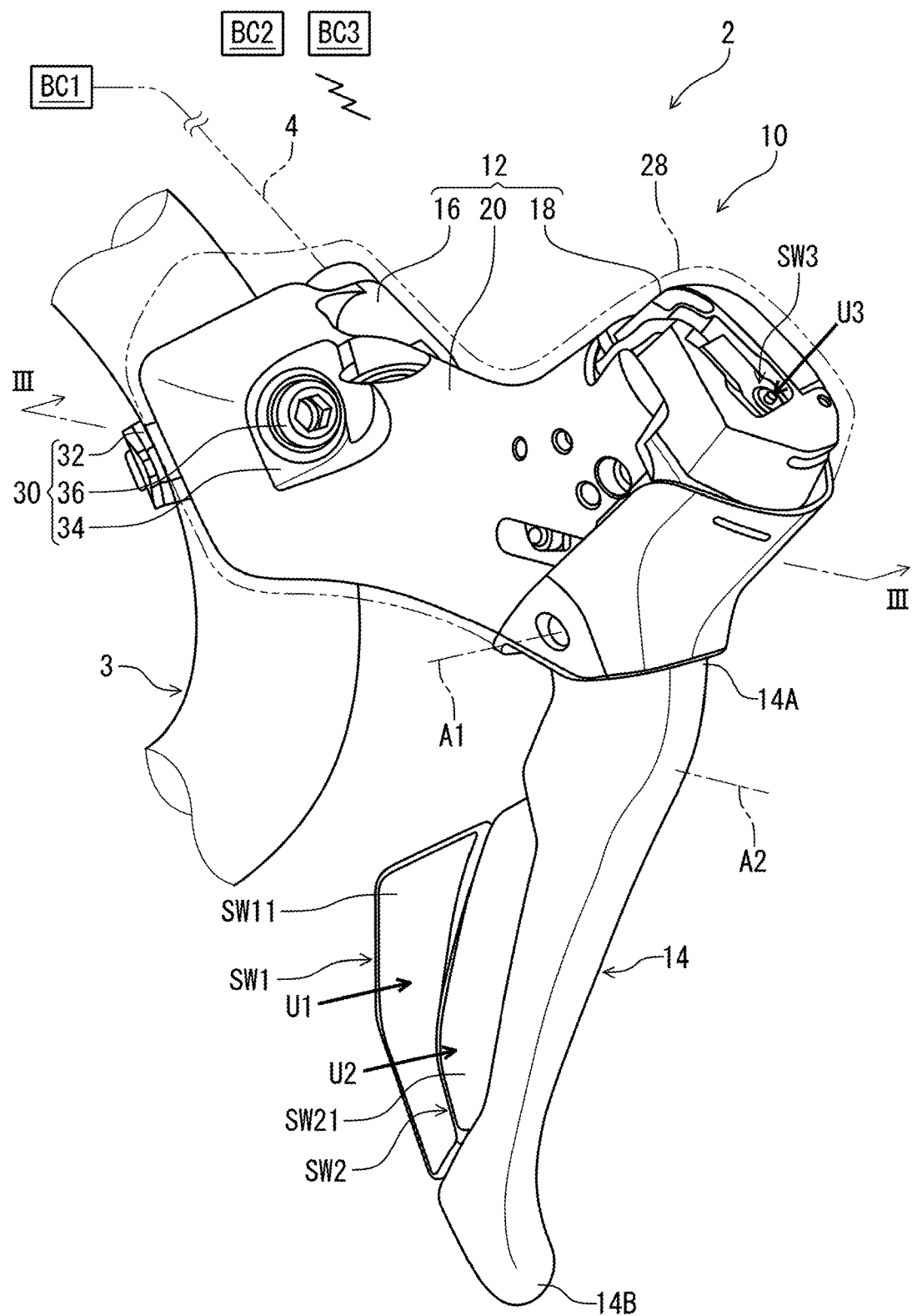
FIG. 1 is a perspective view of an operating device in accordance with an embodiment.

The embodiment(s) will now be described with reference to the accompanying drawings, wherein like reference numerals designate corresponding or identical elements throughout the various drawings.

As seen in FIG. 1, an operating device 10 for a human-powered vehicle 2 is configured to be mounted to a handlebar 3. In the present embodiment, the operating device 10 is configured to be mounted to a drop-down handlebar. However, structures of the operating device 10 can be applied to other operating devices mounted to other type of handlebars such as a flat handlebar, a time trial handlebar, and a bull horn handlebar.

For example, the human-powered vehicle 2 is a vehicle to travel with a motive power including at least a human power of a user who rides the human-powered vehicle 2 (i.e., rider). The human-powered vehicle 2 has an arbitrary number of wheels. For example, the human-powered vehicle 2 has at least one wheel. In the present embodiment, the human-powered vehicle 2 preferably has a smaller size than that of a four-wheeled automobile. However, the human-powered vehicle 2 can have an arbitrary size. For example, the human-powered vehicle 2 can have a larger size than that of the four-wheeled automobile. Examples of the human-powered vehicle 2 include a bicycle, a tricycle, and a kick scooter. In the present embodiment, the human-powered vehicle 2 is a bicycle. An electric assisting system including an electric motor can be applied to the human-powered vehicle 2 (e.g., the bicycle) to assist muscular motive power of the user. Namely, the human-powered vehicle 2 can be an E-bike.

The operating device 10 is operatively coupled to at least one device to operate the at least one device. In the present embodiment, the operating device 10 is operatively coupled to an operated device BC1 such as a brake device. The operating device 10 is operatively coupled to the operated device BC1 via a hydraulic hose 4. However, the operating device 10 can be operatively coupled to a mechanical component such as a brake device via a mechanical control cable including an inner wire. The operated device BC1 can include devices other than a brake device.

The operating device 10 is electrically connected to an electric component BC2 and an additional electric component BC3. In the present embodiment, the operating device 10 is wirelessly connected to the electric component BC2 and the additional electric component BC3. However, the operating device 10 can be connected to the electric component BC2 and the additional electric component BC3 via an electrical control cable.

Examples of the electric component BC2 and the additional electric component BC3 include an additional or satellite operating device, an adjustable seatpost, a suspension, a gear changing device, a brake device, a lighting device, and a display device. In the present embodiment, the electric component BC2 includes a gear shifting device such as a derailleur. The additional electric component BC3 includes an adjustable seatpost. However, the electric component BC2 and the additional electric component BC3 are not limited to the above devices.

In the present embodiment, the operating device 10 is a right-hand side operating/control device configured to be operated by the rider's right hand to actuate the operated device BC1. However, the structures of the operating device 10 can be applied to a left-hand side operating device.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or seat) in the human-powered vehicle 2 with facing the handlebar 3. Accordingly, these terms, as utilized to describe the operating device 10 or other components, should be interpreted relative to the human-powered vehicle 2 equipped with the operating device 10 as used in an upright riding position on a horizontal surface.

The operating device 10 comprises switches SW1, SW2, and SW3. The switch SW1 is configured to be activated in response to a user input U1. The switch SW2 is configured to be activated in response to a user input U2. The switch SW3 is configured to be activated in response to a user input U3. In the present embodiment, the electric component BC2 is configured to be operated in response to the user inputs U1 and U2 of the switches SW1 and SW2. The additional electric component BC3 is configured to be operated in response to the user input U3 of the switch SW3. For example, the electric component BC2 is configured to upshift and downshift in response to the user inputs U1 and U2 received by the switches SW1 and SW2. The additional electric component BC3 is configured to change a state of the additional electric component BC3 between a lock state and an adjustable state in response to the user input U3 received by the switch SW3. However, each of the switches SW1 to SW3 can be used to operate other devices.

Figure 2:
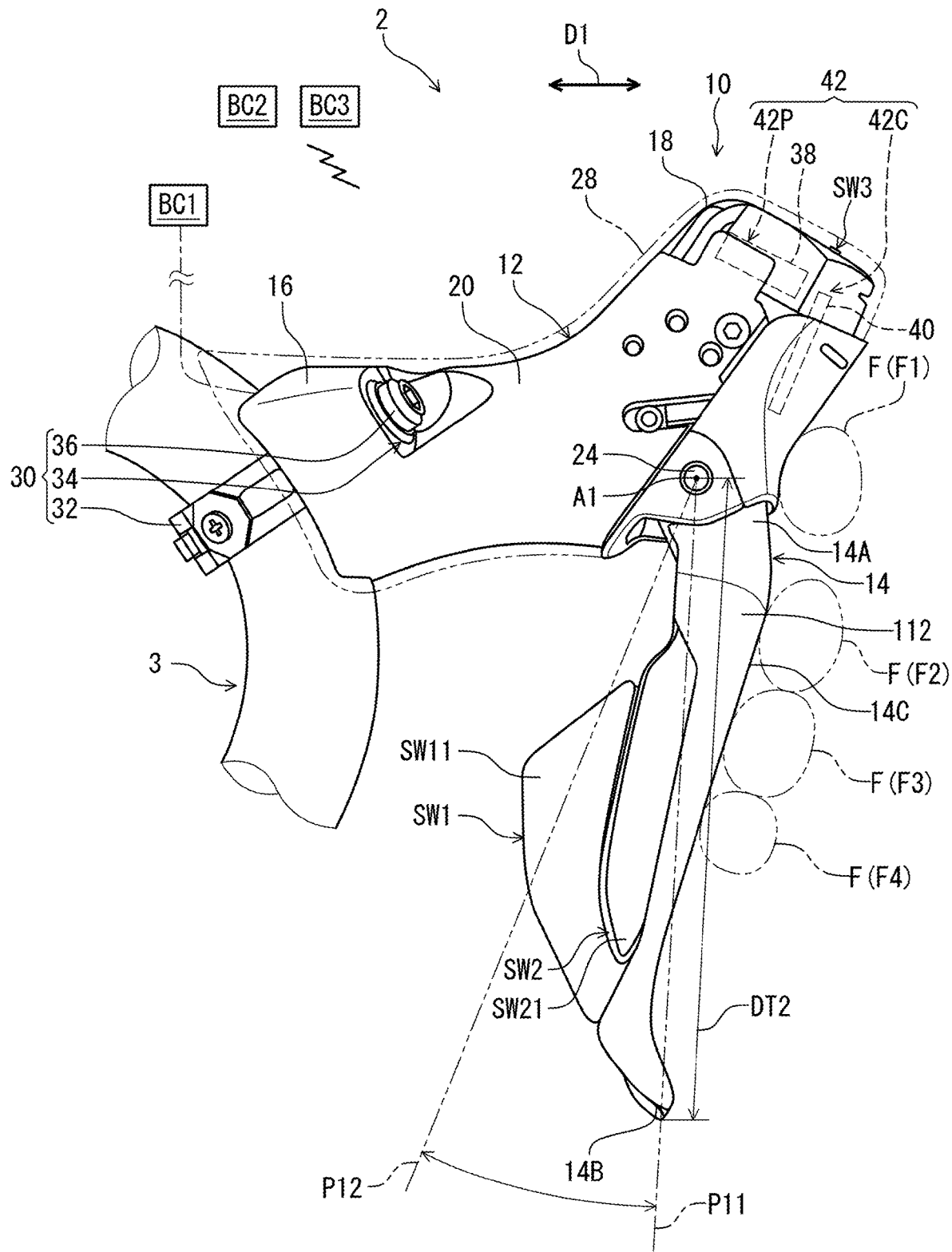
FIG. 2 is a side elevational view of the operating device illustrated in FIG. 1.

As seen in FIG. 2, the operating device 10 for the human-powered vehicle 2 comprises a base member 12 and an operating member 14. The base member 12 extends in a longitudinal direction D1. The base member 12 includes a first end portion 16 and a second end portion 18. The first end portion 16 is configured to be coupled to the handlebar 3. The second end portion 18 is opposite to the first end portion 16 in the longitudinal direction D1. The second end portion 18 constitutes a free end portion of the base member 12. The base member 12 includes a grip portion 20 provided between the first end portion 16 and the second end portion 18. The grip portion 20 is provided between the first end portion 16 and the second end portion 18 in the longitudinal direction D1.

The operating member 14 is pivotally coupled to the base member 12 about a pivot axis A1 between a rest position P11 and an operated position P12. The pivot axis A1 is provided closer to the second end portion 18 than to the first end portion 16. The operating member 14 includes a proximal end portion 14A and a distal end portion 14B opposite to the proximal end portion 14A. The operating member 14 extends from the proximal end portion 14A to the distal end portion 14B. The proximal end portion 14A is closer to the pivot axis A1 than the distal end portion 14B.

The operating device 10 includes a pivot shaft 24 defining the pivot axis A1. The pivot shaft 24 pivotally couples the operating member 14 to the base member 12. The rest position P11 and the operated position P12 are defined by the pivot axis A1 and the distal end portion 14B.

In the present application, the term "rest position" as used herein refers to a position at which a movable part such as the operating member 14 remains stationary in a state where the movable part is not operated by the user. The term "operated position" as used herein refers to a position at which the movable part has been operated by the user to perform the operation of a device such as the operated device BC1.

The operating device 10 further comprises a grip cover 28. The grip cover 28 is configured to be attached to the base member 12 so as to at least partly cover the base member 12 in a state where the grip cover 28 is attached to the base member 12. For example, the grip cover 28 is made of a non-metallic material such as an elastic material. Examples of the elastic material include rubber. A rider sometimes grips the base member 12 (e.g., the grip portion 20) and leans on the base member 12 (e.g., the grip portion 20) through the grip cover 28 during riding. The grip cover 28 can be omitted from the operating device 10.

The switches SW1 and SW2 are mounted to the operating member 14 to be movable relative to the base member 12 along with the operating member 14. The switch SW3 is mounted to the base member 12. The switch SW3 is provided to the second end portion 18. The switch SW3 is provided between the base member 12 and the grip cover 28. The switch SW3 is configured to be operated by the user via the grip cover 28. However, the positions of the switches SW1, SW2, and SW3 are not limited to the present embodiment.

The operating device 10 further comprises a mounting structure 30 configured to couple the first end portion 16 to the handlebar 3. The mounting structure 30 preferably includes a band clamp 32 and a tightening member 34. The tightening member 34 is configured to couple the band clamp 32 to the first end portion 16. The tightening member 34 includes a mounting bolt 36 so as to clamp the handlebar 3 between the band clamp 32 and the first end portion 16. The mounting structure 30 can include other structures which is similar to the band clamp 32 and which is used in a road shifter for mounting to a drop-down handlebar.

As seen in FIG. 2, the operating device 10 for the human-powered vehicle 2 comprises a power supply 38 and circuitry 40. At least one of the power supply 38 and the circuitry 40 is at least partly provided at the second end portion 18. In the present embodiment, both the power supply 38 and the circuitry 40 are entirely provided at the second end portion 18. However, at least one of the power supply 38 and the circuitry 40 can be at least partly provided at portions other than the second end portion 18.

The power supply 38 is configured to supply electricity to the circuitry 40 and other components. Examples of the power supply 38 include a primary battery, a secondary battery, and a capacitor. For example, the power supply 38 includes a button cell shaped as a flat cylinder. However, the power supply 38 is not limited to the present embodiment.

The base member 12 includes an accommodating part 42. The accommodating part 42 is provided to the second end portion 18. The accommodating part 42 is configured to accommodate at least one of the power supply 38 and the circuitry 40. The accommodating part 42 is configured to accommodate the power supply 38 and the circuitry 40. Specifically, the accommodating part 42 includes a power-supply accommodating part 42P and a circuitry accommodating part 42C. The power-supply accommodating part 42P is configured to accommodate the power supply 38. The circuitry accommodating part 42C is configured to accommodate the circuitry 40. However, the accommodating part 42 can be configured to accommodate only one of the power supply 38 and the circuitry 40. One of the power-supply accommodating part 42P and the circuitry accommodating part 42C can be omitted from the accommodating part 42.

As seen in FIG. 2, the operating member 14 includes an outer surface 14C. The outer surface 14C is configured to face away from the first end portion 16 in a rest state where the operating member 14 is in the rest position P11. The outer surface 14C extends from the proximal end portion 14A to the distal end portion 14B. The outer surface 14C is contactable with the rider's finger F (e.g., at least one of an index finger F1, a middle finger F2, a ring finger F3, and a little finger F4) when the operating member 14 is pivoted from the rest position P11 to the operated position P12 by the rider.

Figure 3:
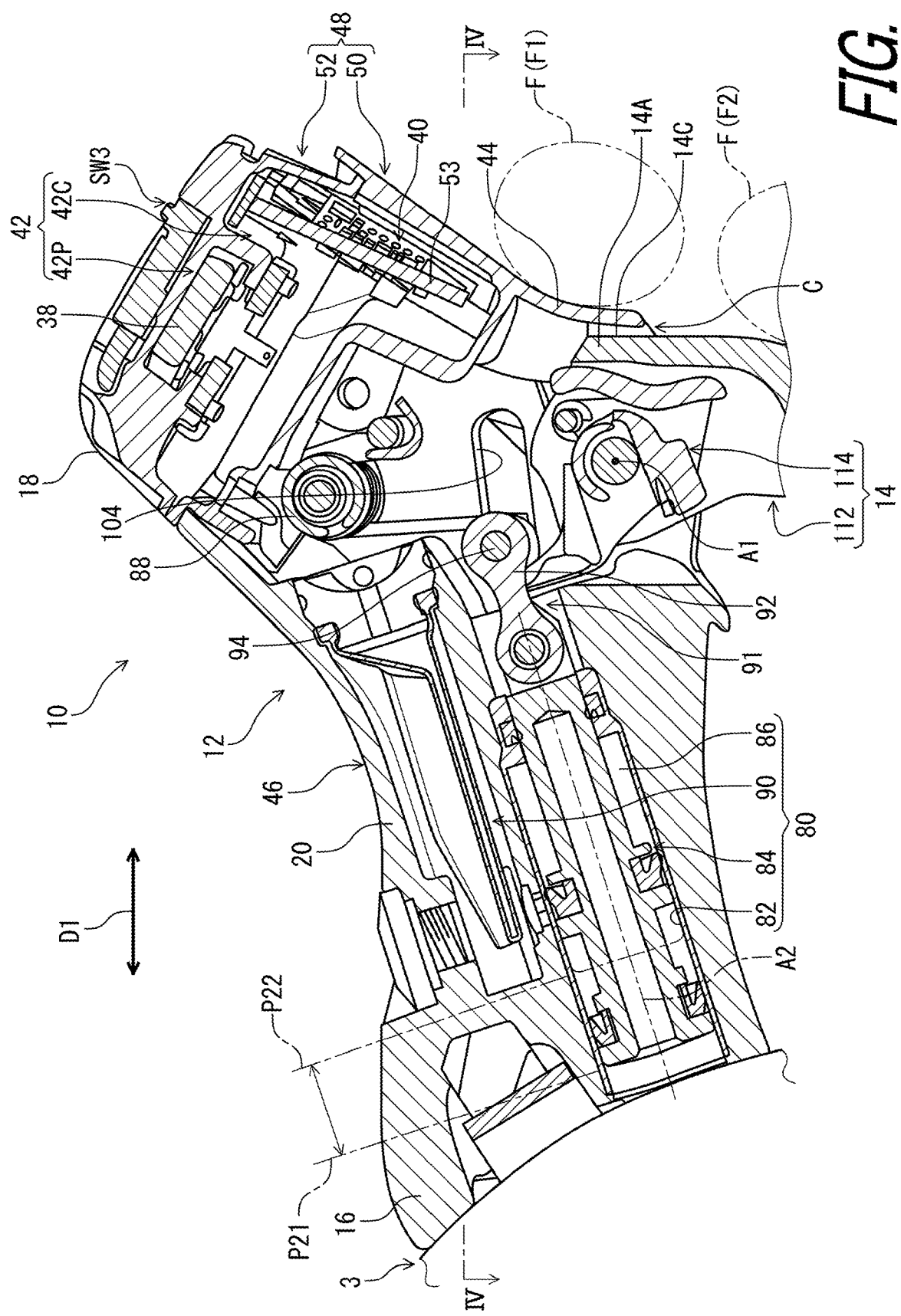
FIG. 3 is a cross-sectional view of the operating device taken along line of FIG. 1.

As seen in FIG. 3, the second end portion 18 includes a cover portion 44 provided on a reverse side of the first end portion 16 in the longitudinal direction D1. The cover portion 44 has a curved shape as viewed along the pivot axis A1. The curved shape of the cover portion 44 is concave toward the first end portion 16 as viewed along the pivot axis A1. The curved shape of the cover portion 44 is concave in the longitudinal direction D1 toward the first end portion 16 as viewed along the pivot axis A1. The curved shape is configured to position the rider's finger F. The cover portion 44 is configured to position the rider's finger F with respect to the base member 12. However, the cover portion 44 can have another shape instead of or in addition to the curved shape as viewed along the pivot axis A1.

Figure 4:
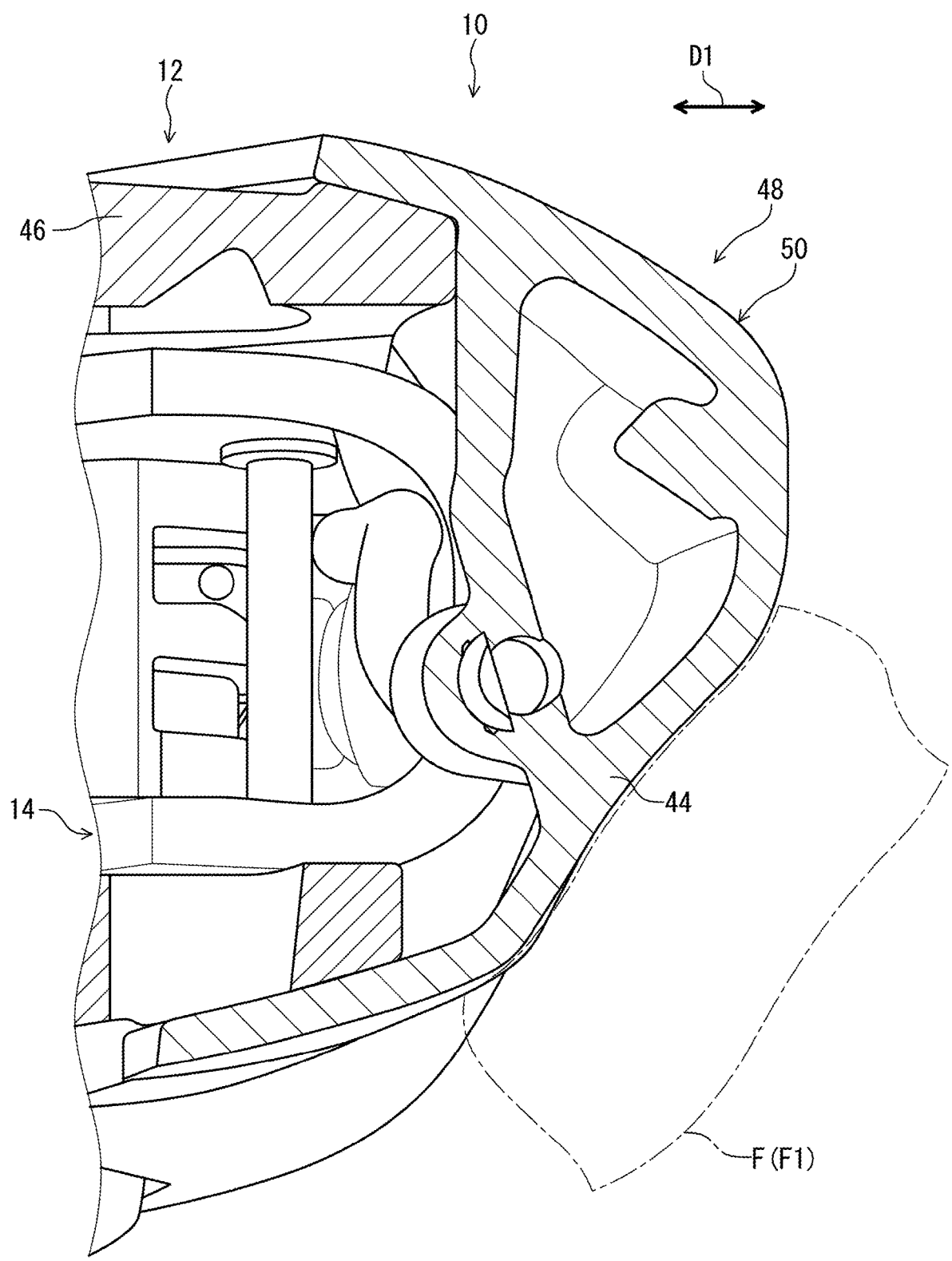
FIG. 4 is a partial cross-sectional view of the operating device taken along line IV-IV of FIG. 3.

As seen in FIG. 4, the cover portion 44 has a curved shape in a cross section taken along the longitudinal direction D1. The curved shape of the cover portion 44 is concave toward the inside of the base member 12 in the cross section. The curved shape is configured to position the rider's finger F. However, the cover portion 44 can have another shape instead of or in addition to the curved shape in the cross section taken along the longitudinal direction D1.

As seen in FIG. 3, a clearance C is provided between the base member 12 and the outer surface 14C of the operating member 14 in the rest state. The clearance C is provided between the base member 12 and the outer surface 14C of the operating member 14 in the longitudinal direction D1 in the rest state such that the operating member 14 is pivotally moved with respect to the base member 12 between the rest position P11 and the operated position P12. The clearance C is more than 0 min while the operating device is pivotally moved with respect to the base member 12 between the rest position P11 and the operated position P12. Namely, the cover portion 44 is arranged not to contact the operating member 14 while the operating device is pivotally moved with respect to the base member 12 between the rest position P11 and the operated position P12.

The outer surface 14C is provided between the pivot axis A1 and the cover portion 44 of the base member 12 in the rest state. The outer surface 14C is provided between the pivot axis A1 and the cover portion 44 in the longitudinal direction D1 in the rest state. However, the outer surface 14C can be provided outside a space between the pivot axis A1 and the cover portion 44 of the base member 12 in the rest state.

The base member 12 includes a main body 46 provided between the first end portion 16 and the second end portion 18. The base member 12 includes an attachment member 48 to which the cover portion 44 of the second end portion 18 is provided. The attachment member 48 is made of a first material different from the main body 46. The first material includes a resin material. The second material includes a resin material. Radio wave interference of the attachment member 48 is lower than radio wave interference of the main body 46. Radio wave interference of the first material is lower than radio wave interference of the second material. For example, the first material includes a glass fiber reinforced material. The main body 46 is made of a second material different from the first material. The second material includes a carbon fiber reinforced material. Namely, the attachment member 48 is a separate member from the main body 46. The glass fiber reinforced material includes grass fibers and a resin material such as synthetic resin. The carbon fiber reinforced material includes carbon fibers and a resin material such as synthetic resin. However, the first material and the second material are not limited to the present embodiment. The first material can be the same as the second material. The first material may include any robust material with radio wave interference equal to radio wave interference of the second material. The attachment member 48 is configured to be detachably attached to the main body 46. However, the attachment member 48 can be integrally provided with the main body 46 as a one-piece unitary member.

The term "detachable" or "detachably," as used herein, encompasses a configuration in which an element is repeatedly detachable from and attachable to another element without substantial damage.

The main body 46 includes the first end portion 16 and the grip portion 20. The attachment member 48 includes the second end portion 18. The attachment member 48 includes a first attachment member 50 and a second attachment member 52. The first attachment member 50 is a separate member from the second attachment member 52. The first attachment member 50 includes the cover portion 44. The accommodating part 42 is provided in the attachment member 48. The circuitry accommodating part 42C is provided in the second attachment member 52. The power-supply accommodating part 42P is provided in the first attachment member 50 and the second attachment member 52. The power supply 38 is configured to be provided in the second attachment member 52. The circuitry 40 is configured to be provided in the first attachment member 50 and the second attachment member 52. The circuitry 40 includes a circuit board 53. The circuitry 40 includes the circuit board 53, such that the circuitry 40 could be embedded, printed on, or attached to a substrate. The circuit board 53 is provided in the first attachment member 50 and the second attachment member 52. The switch SW3 is attached to the second attachment member 52.

Figure 5:
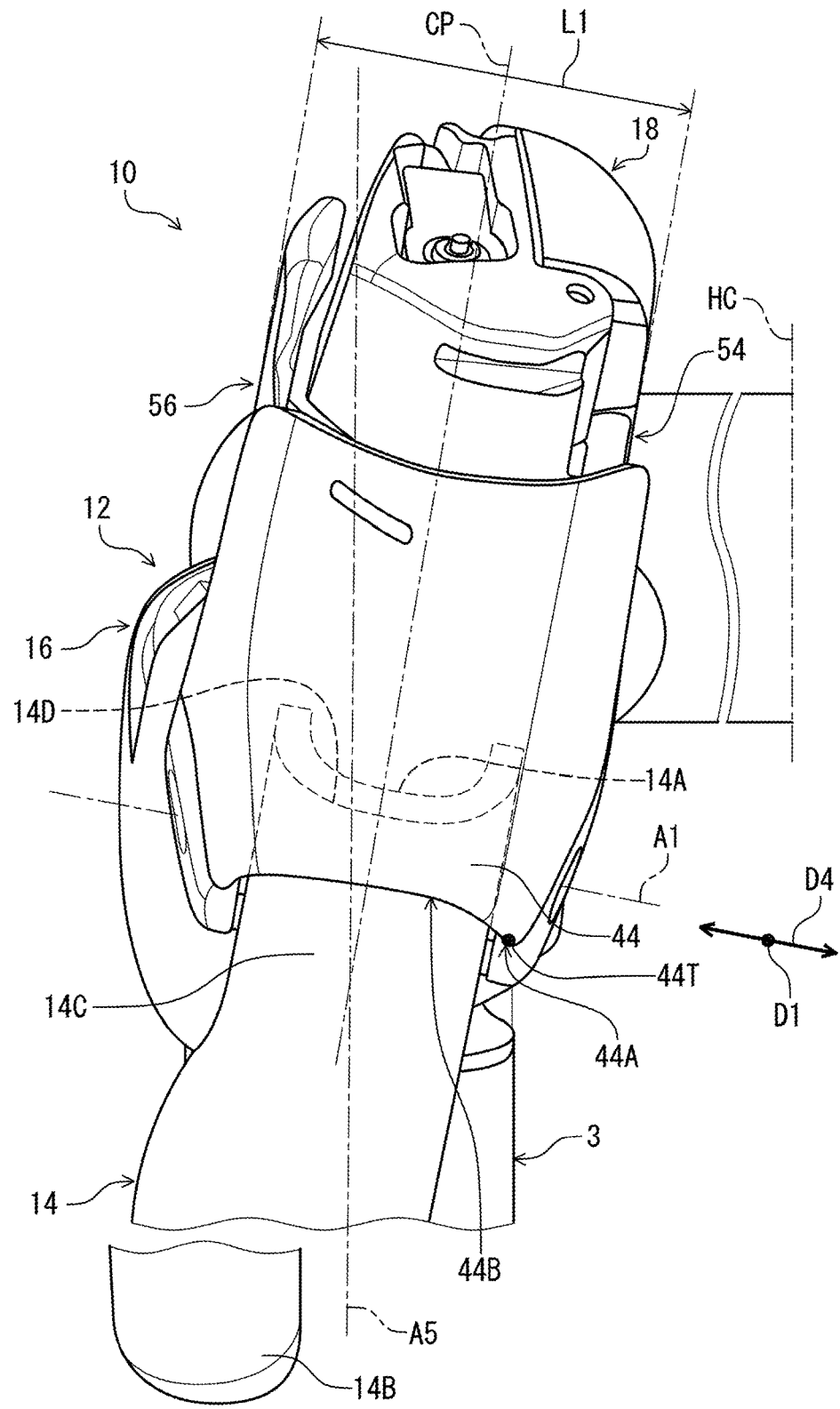
FIG. 5 is a front view of the operating device illustrated in FIG. 1.

As seen in FIG. 5, the cover portion 44 is configured to be arranged on a pivotal movement track of the operating member 14 so as to at least partly overlap with the outer surface 14C of the operating member 14 in the rest state as viewed in the longitudinal direction D1. The outer surface 14C is configured to face away from the first end portion 16 so as to at least partly overlap with the cover portion 44 in the rest state where the operating member 14 is in the rest position P11 (see, e.g., FIG. 2) as viewed in the longitudinal direction D1.

The outer surface 14C is configured to partly overlap with the cover portion 44 in the rest state as viewed in the longitudinal direction D1. However, the outer surface 14C can be configured to entirely overlap with the cover portion 44 in the rest state as viewed in the longitudinal direction D1.

The cover portion 44 includes a lowermost end 44A. The outer surface 14C includes an uppermost end 14D. The lowermost end 44A of the cover portion 44 is closer to the distal end portion 14B of the operating member 14 than the uppermost end 14D of the outer surface 14C in the rest state. The lowermost end 44A of the cover portion 44 is provided between the distal end portion 14B of the operating member 14 and the uppermost end 14D of the outer surface 14C in the rest state as viewed in the longitudinal direction D1.

The cover portion 44 includes a lower end 44B. The lower end 44B includes the lowermost end 44A. The lowermost end 44A is provided at a transverse end of the lower end 44B. However, the position of the lowermost end 44A in the lower end 44B is not limited to this embodiment.

The second end portion 18 includes a lateral surface 54 and an additional lateral surface 56 provided on a reverse side of the lateral surface 54 in an axial direction D4 of the pivot axis A1. The second end portion 18 has an asymmetrical shape with respect to a transverse center plane CP of the second end portion 18. The transverse center plane CP is defined to bisect a lateral length L1 defined between the lateral surface 54 and the additional lateral surface 56.

The transverse center plane CP is perpendicular to the pivot axis A1. The attachment member 48 has an asymmetrical shape with respect to the transverse center plane CP of the second end portion 18. The cover portion 44 has an asymmetrical shape with respect to a transverse center plane CP of the second end portion 18. However, the second end portion 18 can have a symmetrical shape with respect to the transverse center plane CP of the second end portion 18. The attachment member 48 can have a symmetrical shape with respect to the transverse center plane CP of the second end portion 18. The cover portion 44 can have a symmetrical shape with respect to the transverse center plane CP of the second end portion 18. The transverse center plane CP can be inclined relative to the pivot axis A1.

Figure 6:
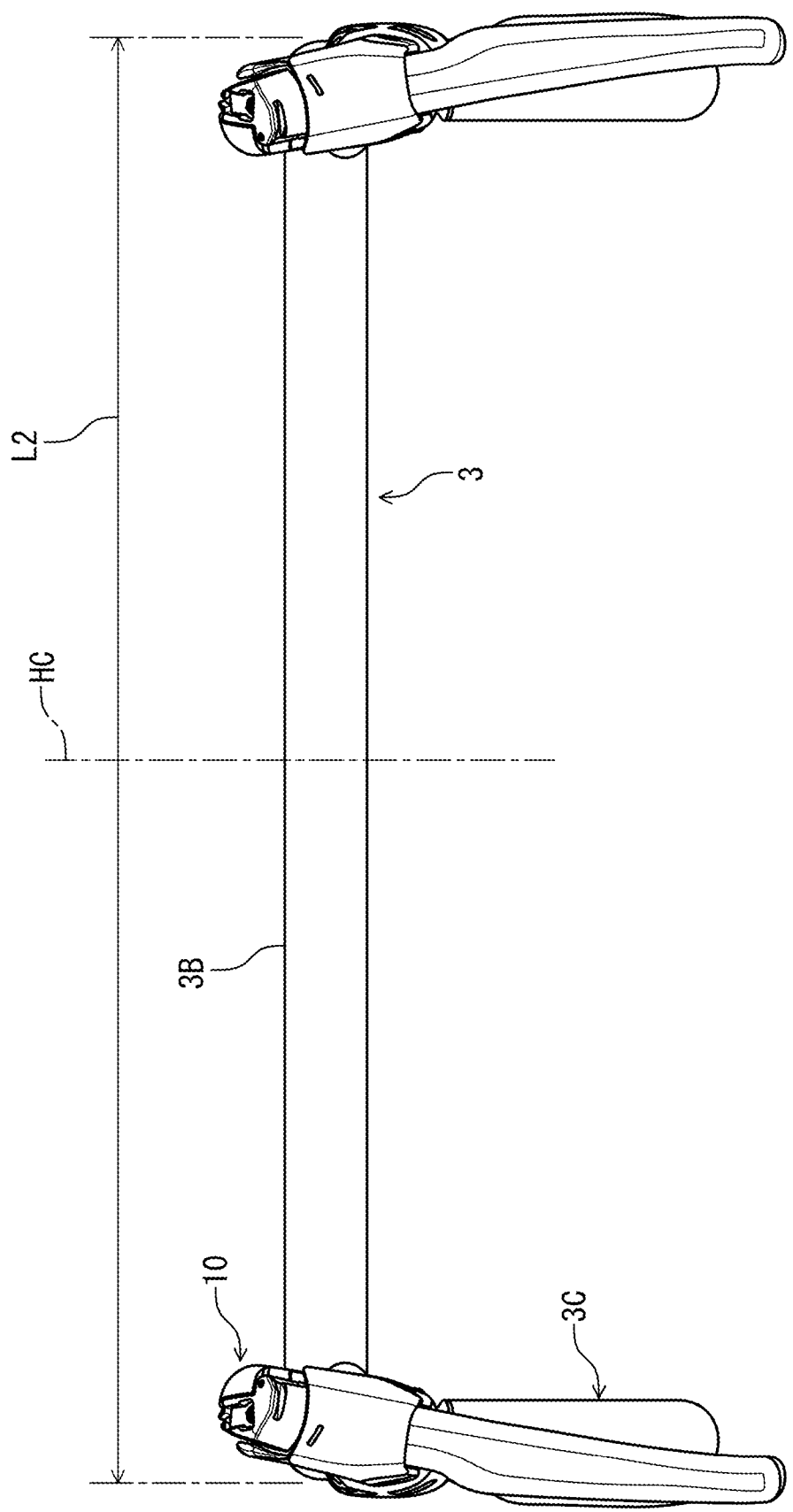
FIG. 6 is a front view of the operating device illustrated in FIG. 1, with a handlebar.

As seen in FIG. 5, a transverse center 44T of the lowermost end 44A is offset from the transverse center plane CP of the second end portion 18 toward one of the lateral surface 54 and the additional lateral surface 56. The transverse center 44T of the lowermost end 44A is offset from the transverse center plane CP of the second end portion 18 toward the lateral surface 54. The transverse center 44T of the lowermost end 44A is closer to a handlebar center plane HC than the transverse center plane CP in a mounting state where the first end portion 16 is coupled to the handlebar 3. As seen in FIG. 6, the handlebar center plane HC bisects a lateral length L2 of the handlebar 3.

Figure 7:
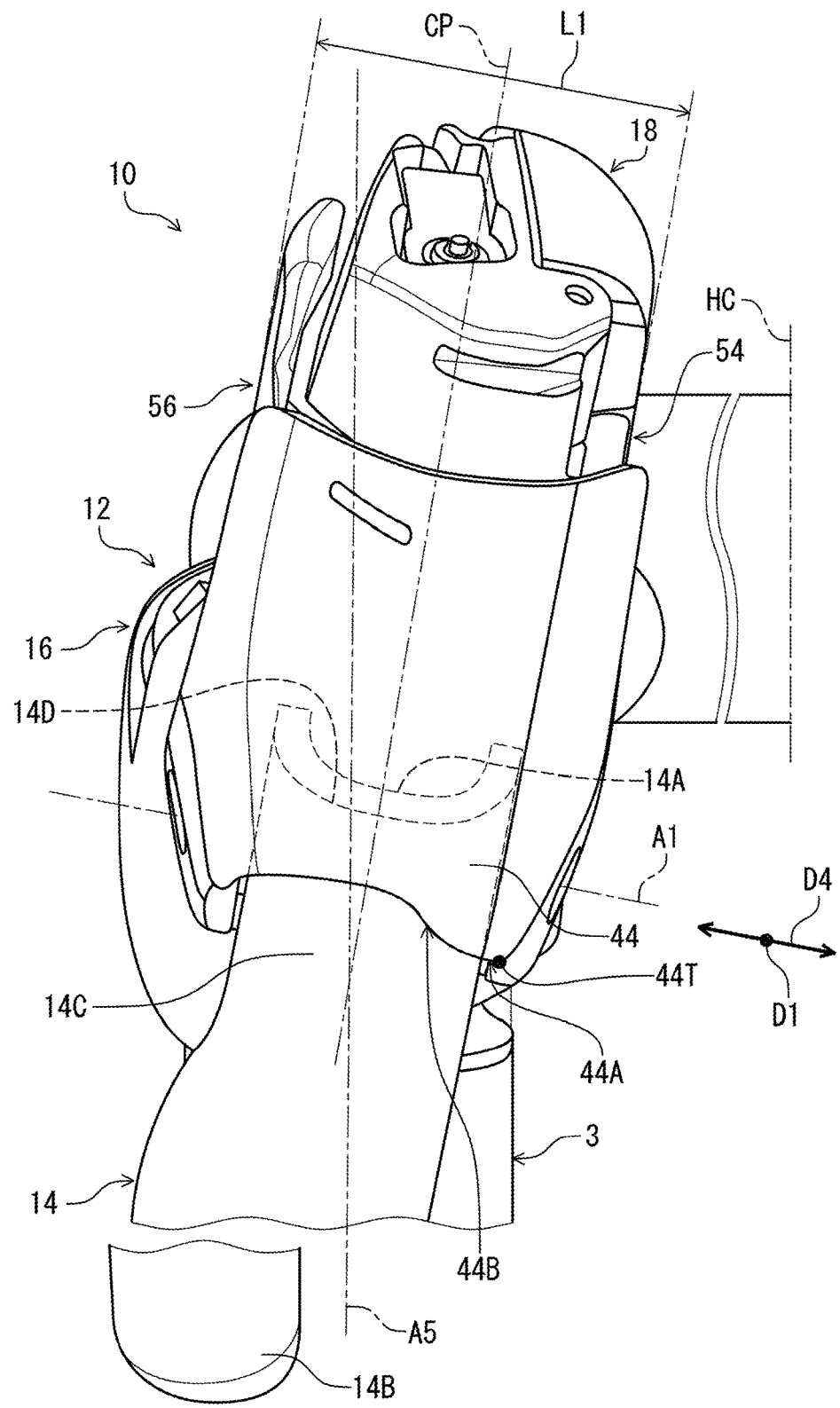
FIG. 7 is a front view of the operating device illustrated in FIG. 1 (modification).

The shape of the lower end 44B of the cover portion 44 is not limited to the shape illustrated in FIG. 5. The lower end 44B illustrated in FIG. 5 has a concave shape as viewed in the longitudinal direction D1. As seen in FIG. 7, however, the lower end 44B of the cover portion 44 can have a concave and convex shape.

Figure 8:
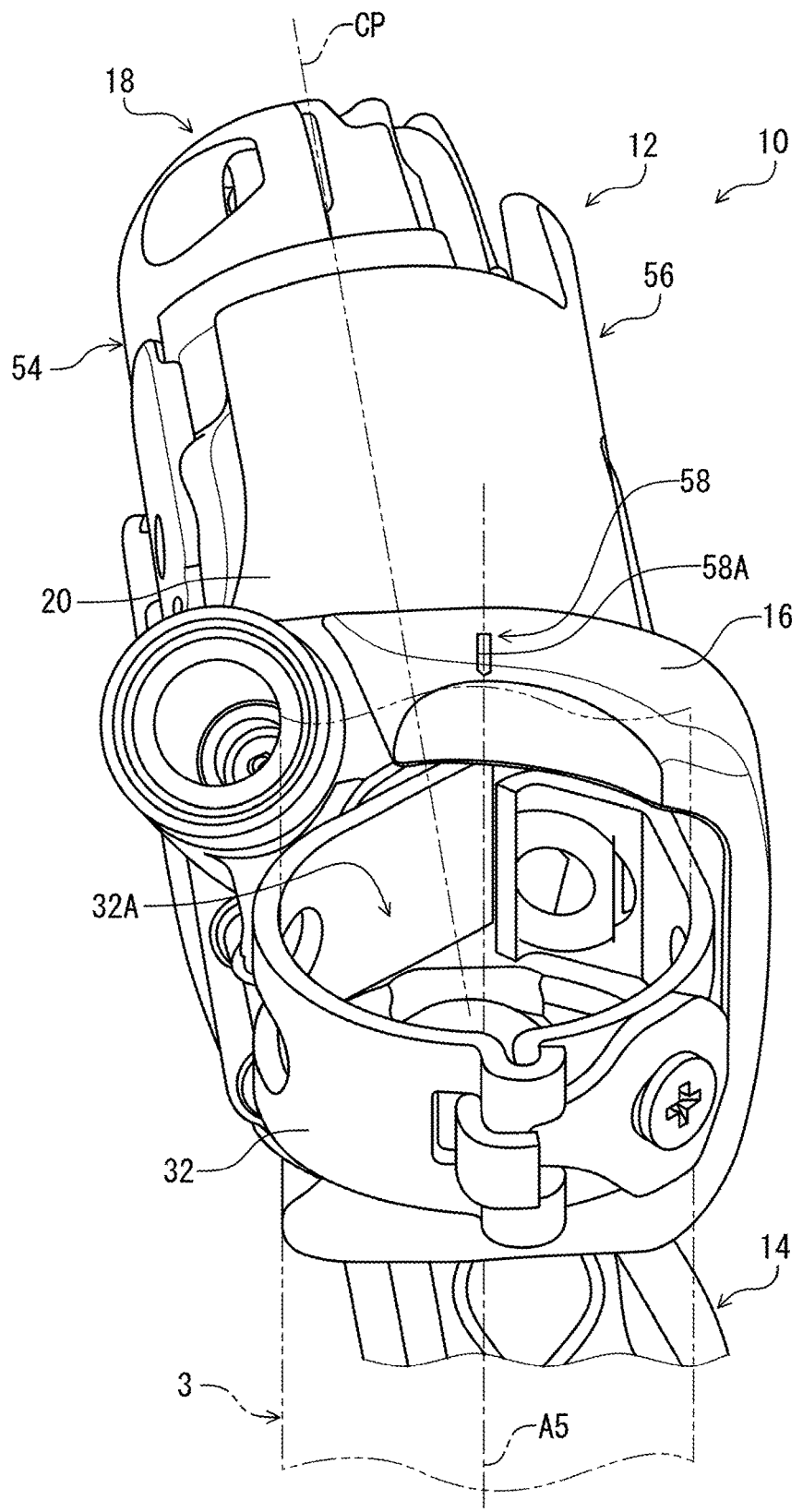
FIG. 8 is a rear view of the operating device illustrated in FIG. 1.

As seen in FIG. 8, the band clamp 32 of the mounting structure 30 has a center axis A5. The band clamp 32 includes a clamp opening 32A through which the handlebar 3 is to extend. The clamp opening 32A extends along the center axis A5. The transverse center plane CP of the second end portion 18 is inclined relative to the center axis A5 of the band clamp 32 as viewed in the longitudinal direction D1. However, the transverse center plane CP of the second end portion 18 can be perpendicular or parallel to the center axis A5 of the band clamp 32.

As seen in FIG. 5, the transverse center plane CP of the second end portion 18 is inclined relative to the center axis A5 of the band clamp 32 as viewed in the longitudinal direction D1 such that the an upper part of the second end portion 18 is closer to the handlebar center plane HC than the lower end 44B in the mounting state where the first end portion 16 is coupled to the handlebar 3. However, the lower end 44B can be closer to the handlebar center plane HC than the upper part of the second end portion 18 as viewed in the longitudinal direction D1.

The pivot axis A1 is inclined relative to the center axis A5 of the band clamp 32 (see, e.g., FIG. 7) as viewed in the longitudinal direction D1. However, the pivot axis A1 can be perpendicular or parallel to the center axis A5 of the band clamp 32 (see, e.g., FIG. 7) as viewed in the longitudinal direction D1.

As seen in FIG. 8, the base member 12 includes an indicator 58 provided at the first end portion 16. The indicator 58 is configured to indicate a position and/or posture of the operating device 10 relative to the base member 12. In the present embodiment, the indicator 58 includes a groove 58A. The indicator 58 can includes a line, a mark, and/or a projection instead of or in addition to the groove 58A. The indicator 58 can help the user to adjust the position and/or posture of the operating device 10 relative to the handlebar 3 when the operating device 10 is installed to the handlebar 3.

Figure 9:
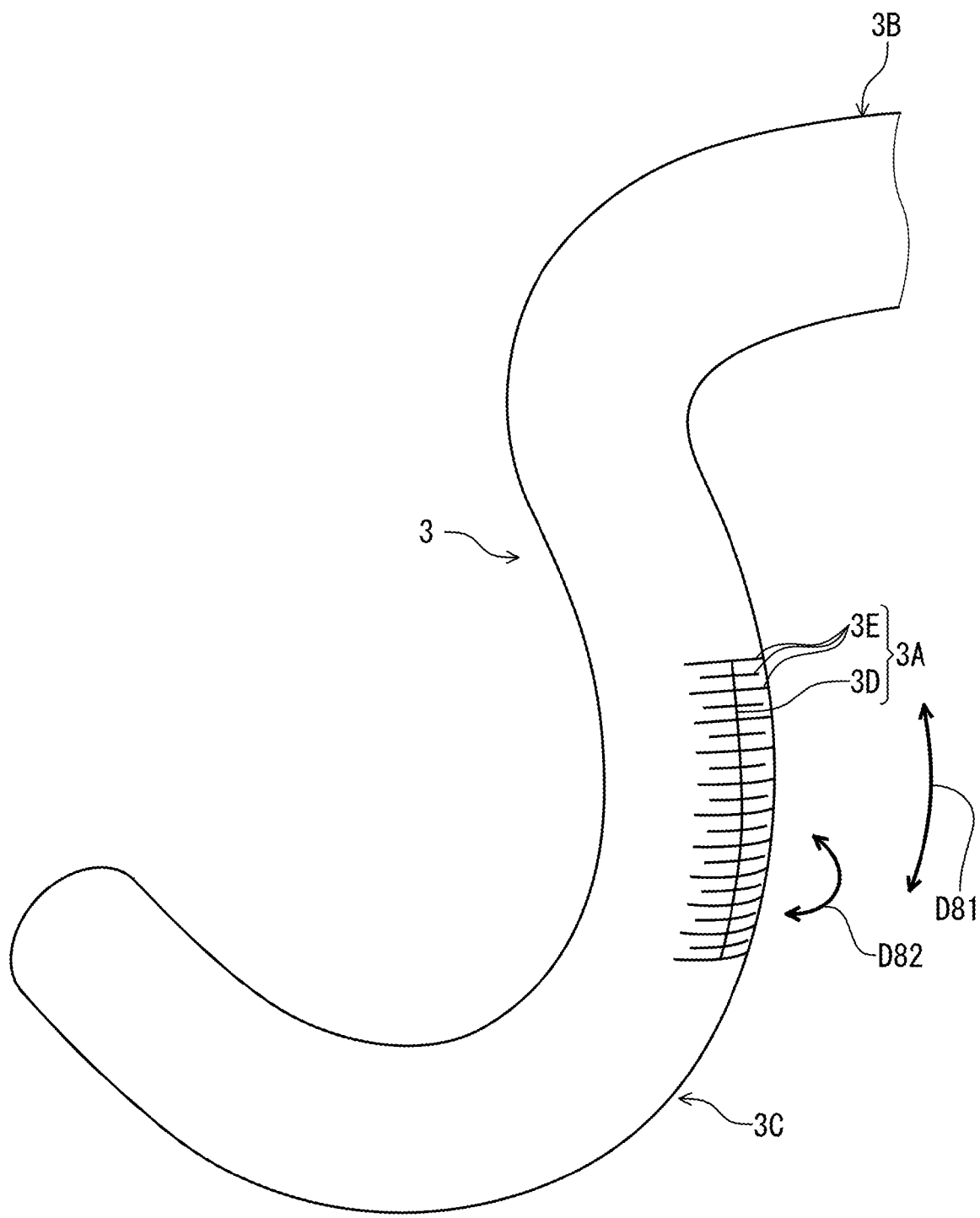
FIG. 9 is a partial perspective view of the handlebar.

As seen in FIG. 9, the handlebar 3 includes a position indicator 3A configured to indicate a target position in which the operating device 10 is to be provided. For example, the position indicator 3A includes at least one of a groove, a line, and a projection. The handlebar 3 includes a straight part 3B and a curved part 3C. The curved part 3C is provided at an end of the straight part 3B. The position indicator 3A is provided on the curved part 3C.

The position indicator 3A includes a first indicator 3D and a plurality of second indicators 3E. The first indicator 3D extends along a curved direction D81. The first indicator 3D is configured to indicate a circumferential center of the curved part 3C in a circumferential direction D82 of the curved part 3C. The second indicators 3E extends in the circumferential direction D82. The second indicators 3E are arranged in the curved direction D81 at regular pitches.

Figure 10:
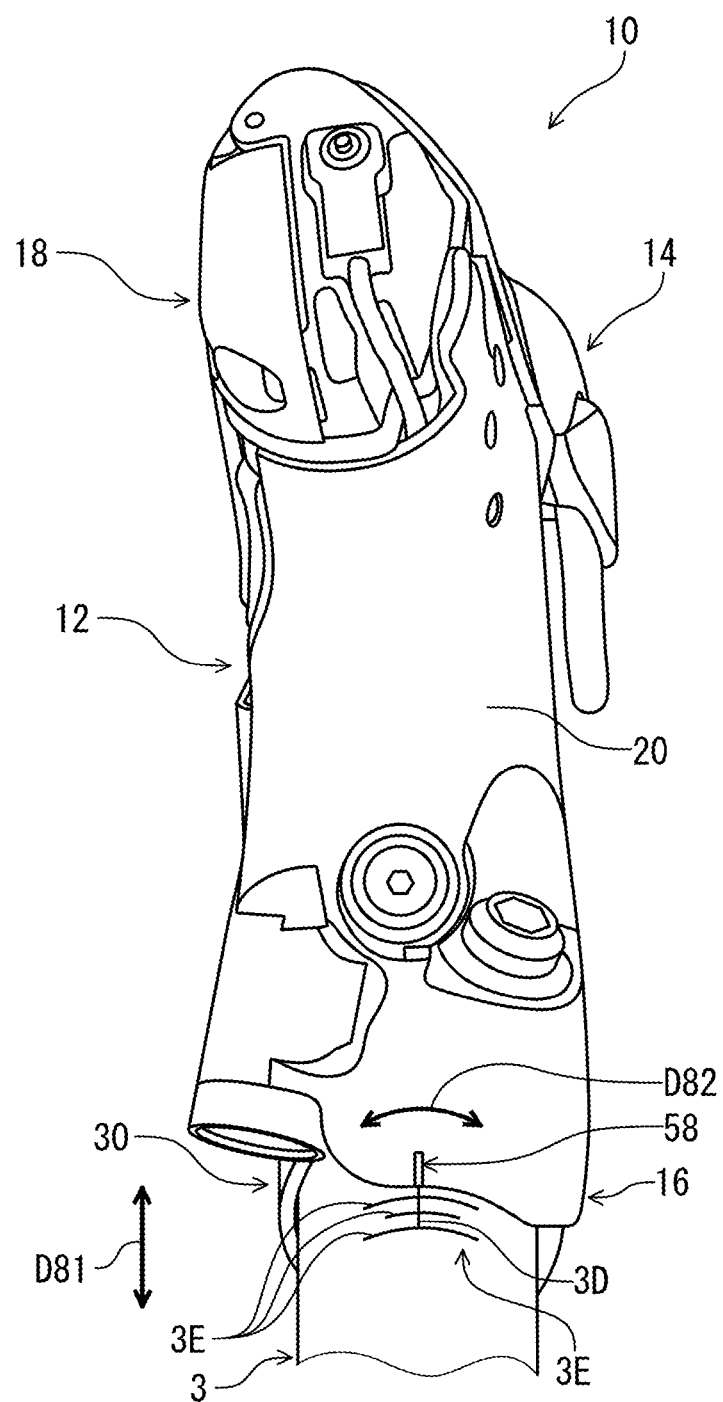
FIG. 10 is a plan view of the operating device illustrated in FIG. 1, with the handlebar.

As seen in FIG. 10, the indicator 58 and the position indicator 3A indicate a relative position between the operating device 10 and the curved part 3C of the handlebar 3. The indicator 58 and the first indicator 3D of the position indicator 3A indicate a circumferential relative position between the operating device 10 and the curved part 3C of the handlebar 3 in the circumferential direction D82. For example, the operating device 10 is provided at a center position relative to the curved part 3C of the handlebar 3 in a state where the indicator 58 is provided on the first indicator 3D. The indicator 58 and the second indicator 3E of the position indicator 3A indicate a relative position between the operating device 10 and the curved part 3C of the handlebar 3 in the curved direction D81.

Figure 11:
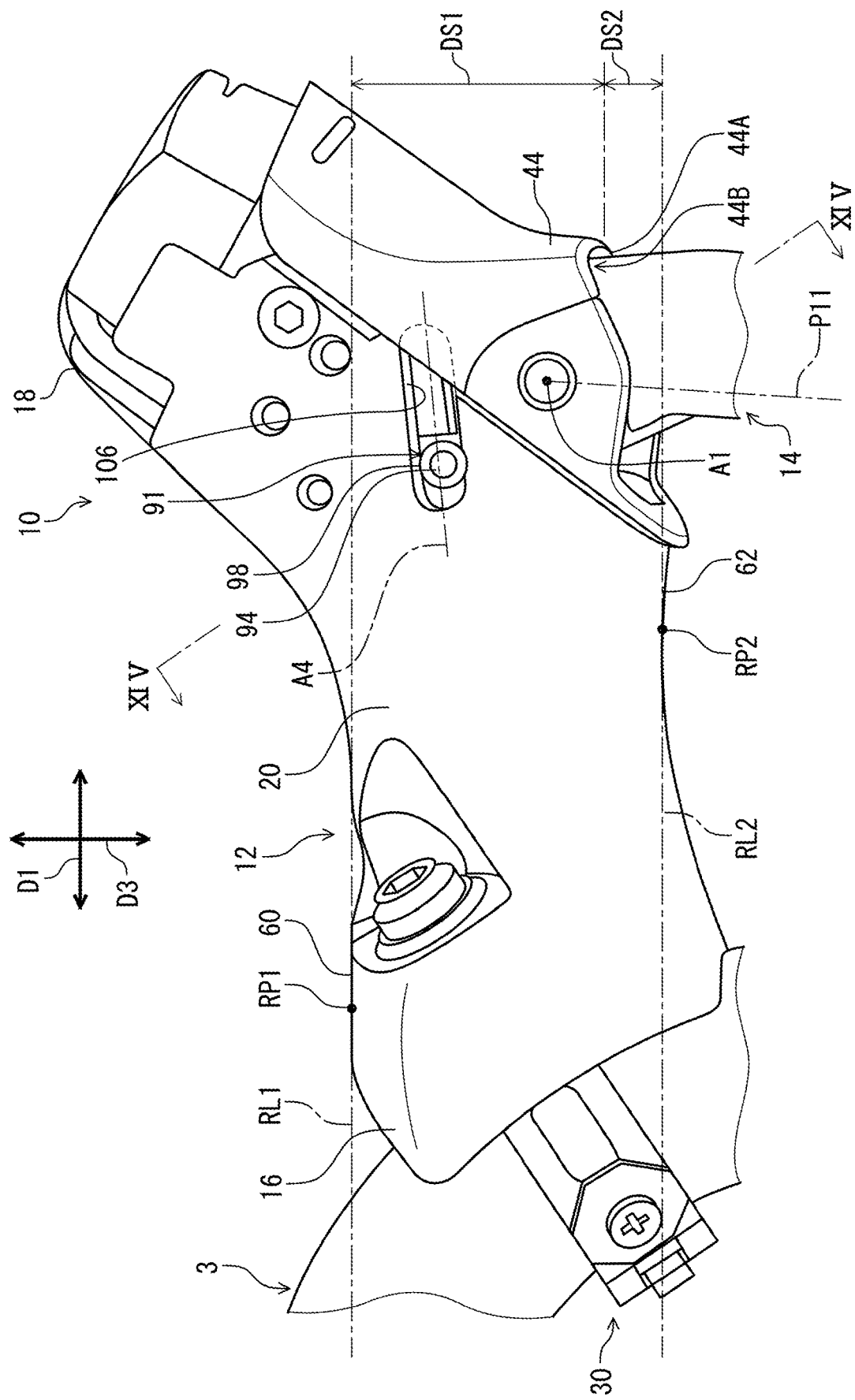
FIG. 11 is a partial side elevational view of the operating device illustrated in FIG. 1.

As seen in FIG. 11, the base member 12 includes an upper surface 60 and a lower surface 62. The upper surface 60 defines an upper reference line RL1 extending along the longitudinal direction D1. The lower surface 62 defines a lower reference line RL2 extending along the longitudinal direction D1. The upper reference line RL1 extends from a lowest point RP1 of the upper surface 60 and is parallel to the longitudinal direction D1. The lower reference line RL2 extends from a highest point RP2 of the lower surface 62 and is parallel to the longitudinal direction D1. However, the upper reference line RL1 can be inclined relative to the longitudinal direction D1. The upper reference line RL1 can extend from a point defined on the upper surface 60 other then the lowest point RP1. The lower reference line RL2 can be inclined relative to the longitudinal direction D1. The lower reference line RL2 can extend from a point defined on the lower surface 62 other then the highest point RP2.

A first distance DS1 from the upper reference line RL1 to the lowermost end 44A in a perpendicular direction D3 perpendicular to the longitudinal direction D1 is larger than a second distance DS2 from the lower reference line RL2 to the lowermost end 44A in the perpendicular direction D3. The lowermost end 44A is closer to the distal end portion 14B of the operating member 14 than the pivot axis A1 in the rest state in the perpendicular direction D3 perpendicular to the longitudinal direction D1. However, the first distance DS1 can be equal to or smaller than the second distance DS2.

Figure 12:
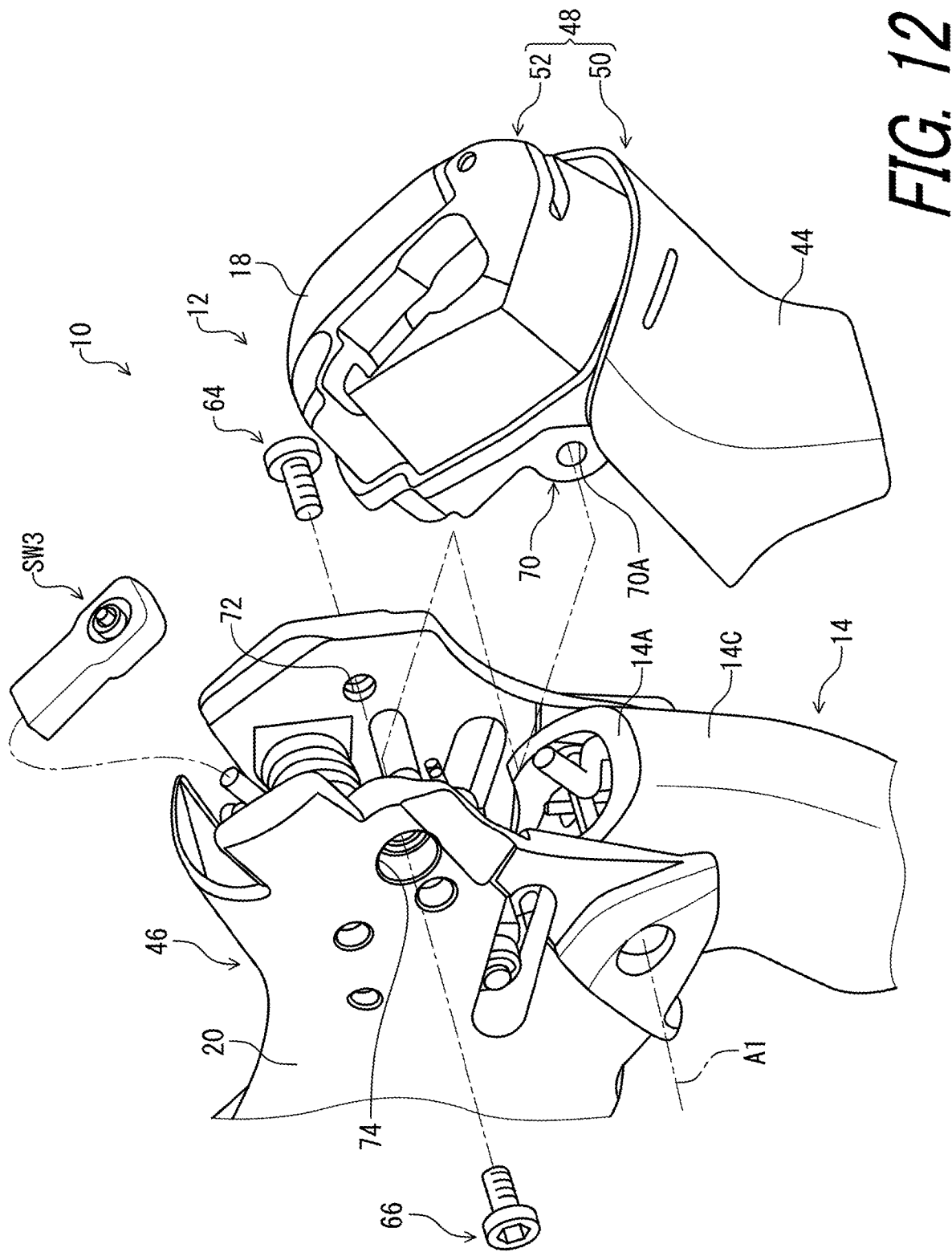
FIG. 12 is an exploded perspective view of a base member of the operating device illustrated in FIG. 1.
Figure 13:
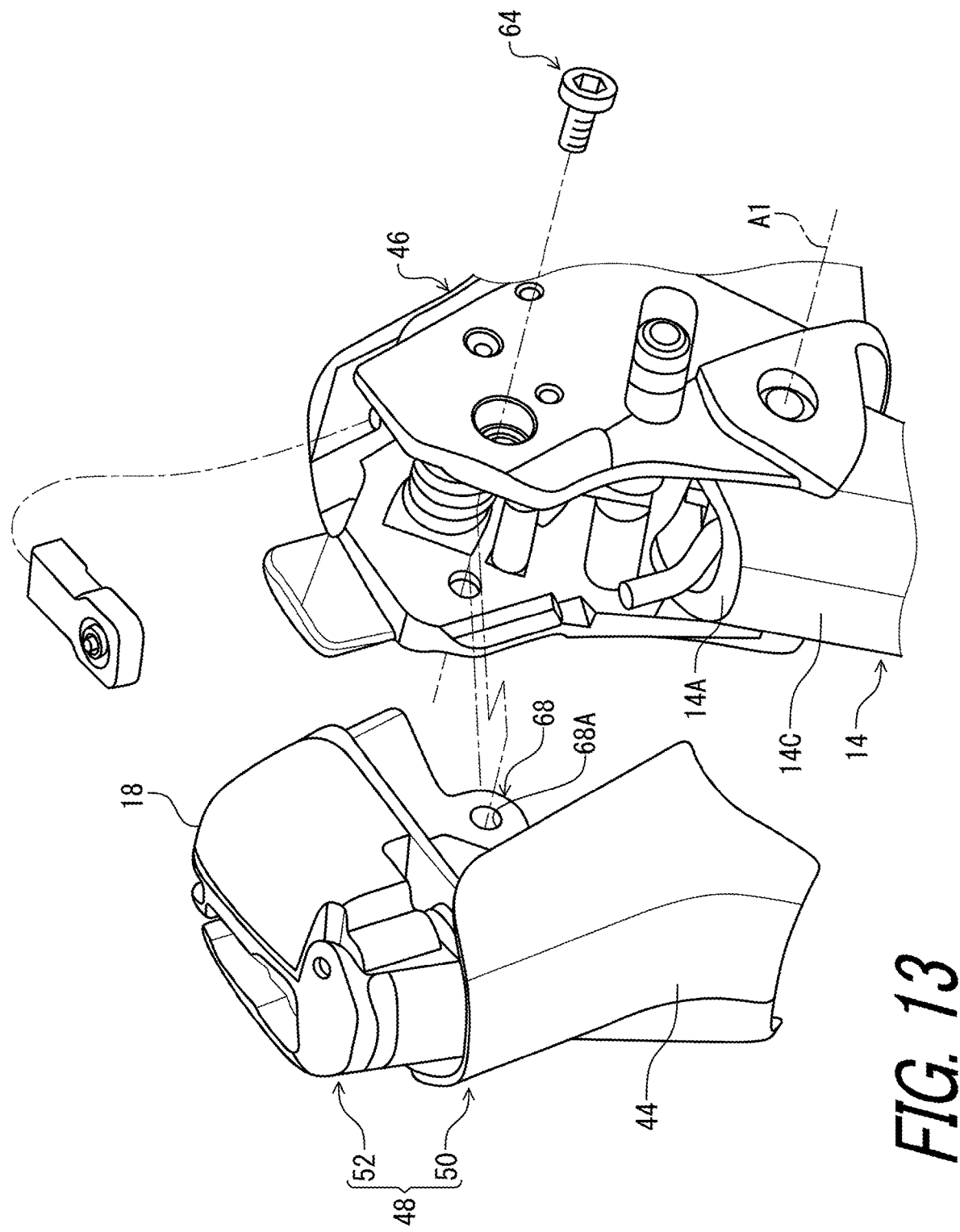
FIG. 13 is an exploded perspective view of a base member of the operating device illustrated in FIG. 1.

As seen in FIGS. 12 and 13, the attachment member 48 is configured to be detachably attached to the main body 46. The attachment member 48 is detachable from the main body 46 without removing the operating member 14 from the base member 12. The attachment member 48 is configured to be detachably attached to the main body 46 with a first fastener 64 and a second fastener 66. The attachment member 48 includes a first receiving part 68 and a second receiving part 70. The first receiving part 68 includes a first threaded hole 68A. The second receiving part 70 includes a second threaded hole 70A. The main body 46 includes a first through-hole 72 and a second through-hole 74. The first fastener 64 is configured to extend through the first through-hole 72 and to be threadedly engaged in the first threaded hole 68A of the first receiving part 68 in a state where the attachment member 48 is attached to the main body 46. The second fastener 66 is configured to extend through the second through-hole 74 and to be threadedly engaged in the second threaded hole 70B of the second receiving part 70 in the state where the attachment member 48 is attached to the main body 46. However, the attachment member 48 can be configured to be detachably attached to the main body 46 with a structure other than the first fastener 64 and the second fastener 66.

As seen in FIG. 3, the operating device 10 includes a hydraulic unit 80 provided in the base member 12. The hydraulic unit 80 is configured to generate hydraulic pressure in response to a movement of the operating member 14. For example, the hydraulic unit 80 includes a cylinder bore 82, a piston 84, a hydraulic chamber 86, a piston biasing member 88, and a reservoir 90. The cylinder bore 82 has a cylinder center axis A2. The piston 84 is movably provided in the cylinder bore 82. The cylinder bore 82 and the piston 84 define the hydraulic chamber 86. The piston biasing member 88 is configured to bias the piston 84 toward the initial position P21.

The operating device 10 comprises a coupling structure 91. The coupling structure 91 is configured to couple the piston 84 to the operating member 14. The piston biasing member 88 is configured to bias the coupling structure 91 such that the piston 84 is moved toward the initial position P21. Thus, the piston biasing member 88 is configured to bias the operating member 14 toward the rest position P11.

The piston 84 is coupled to the operating member 14 to be moved relative to the base member 12 from an initial position P21 to an actuated position P22 in response to a pivotal movement of the operating member 14 from the rest position P11 to the operated position P12. The piston 84 is coupled to the operating member 14 to be pulled in response to the pivotal movement of the operating member 14 from the rest position P11 toward the operated position P12. However, the piston 84 can be coupled to the operating member 14 to be pushed in response to the pivotal movement of the operating member 14 from the rest position P11 toward the operated position P12.

Figure 14:
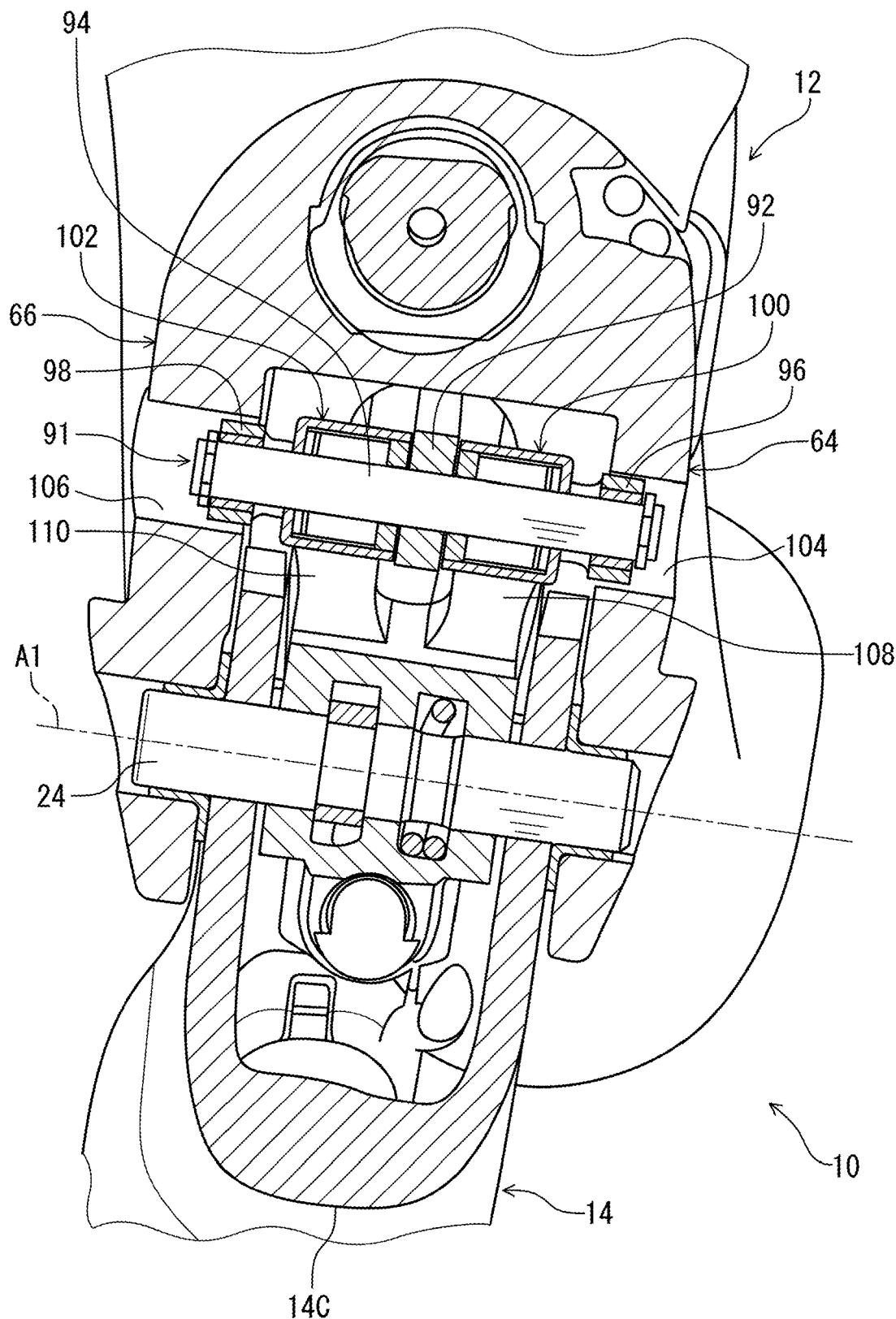
FIG. 14 is a partial cross-sectional view of the operating device taken along line XIV-XIV of FIG. 11.

As seen in FIG. 14, the coupling structure 91 includes a coupling member 92, a rod 94, a first bush 96, a second bush 98, a first bearing 100, and a second bearing 102. As seen in FIG. 3, the coupling member 92 is configured to couple the piston 84 to the rod 94. As seen in FIG. 14, the first bush 96 is attached to a first end of the rod 94. The second bush 98 is attached to a second end of the rod 94. The base member 12 includes a first guide groove 104 and a second guide groove 106. The first bush 96 is movably provided in the first guide groove 104. The second bush 98 is movably provided in the second guide groove 106. The first bearing 100 and the second bearing 102 are provided on the rod 94. The operating member 14 includes a first transmitting part 108 and a second transmitting part 110. The first transmitting part 108 is contactable with the first bearing 100 to transmit the pivotal movement of the operating member 14 to the piston 84 through the coupling structure 91. The second transmitting part 110 is contactable with the second bearing 102 to transmit the pivotal movement of the operating member 14 to the piston 84 through the coupling structure 91.

Figure 15:
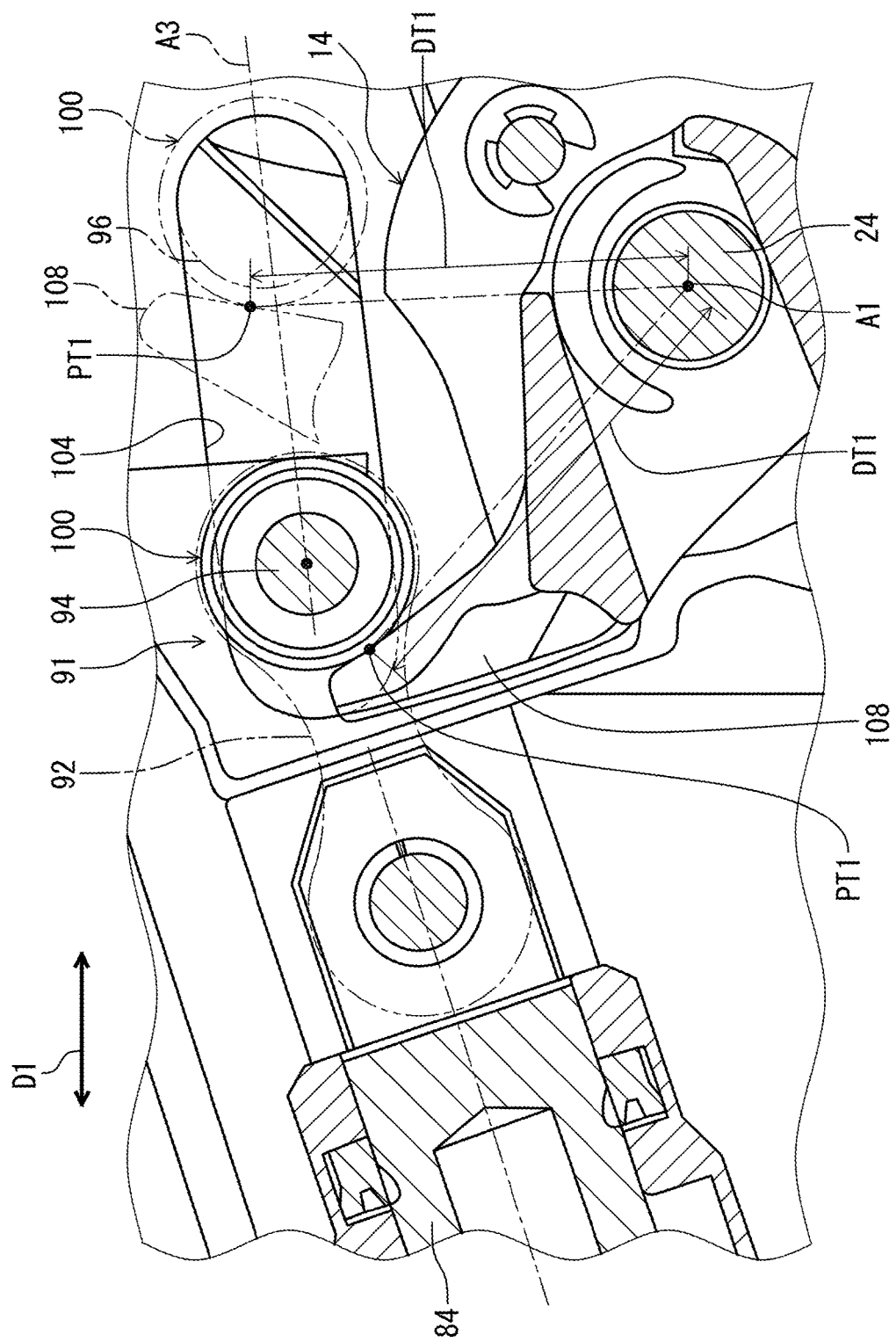
FIG. 15 is a partial cross-sectional view of the operating device illustrated in FIG.

As seen in FIG. 15, the first guide groove 104 linearly extends along the longitudinal direction D1. The first guide groove 104 is inclined relative to the longitudinal direction D1 as viewed along the pivot axis A1. The first guide groove 104 has a first longitudinal axis A3 and extends along the first longitudinal axis A3.

As seen in FIG. 11, the second guide groove 106 linearly extends along the longitudinal direction D1. The second guide groove 106 is inclined relative to the longitudinal direction D1 as viewed along the pivot axis A1. The second guide groove 106 has a second longitudinal axis A4 and extends along the second longitudinal axis A4.

As seen in FIG. 15, the first transmitting part 108 of the operating member 14 is in contact with the first bearing 100 at a contact point PT1. A distance DT1 is defined between the contact point PT1 and the pivot axis A1. The first guide groove 104 is arranged relative to the pivot axis A1 such that the distance DT1 varies depending on a pivot angle of the operating member 14 from the rest position P11.

Figure 16:
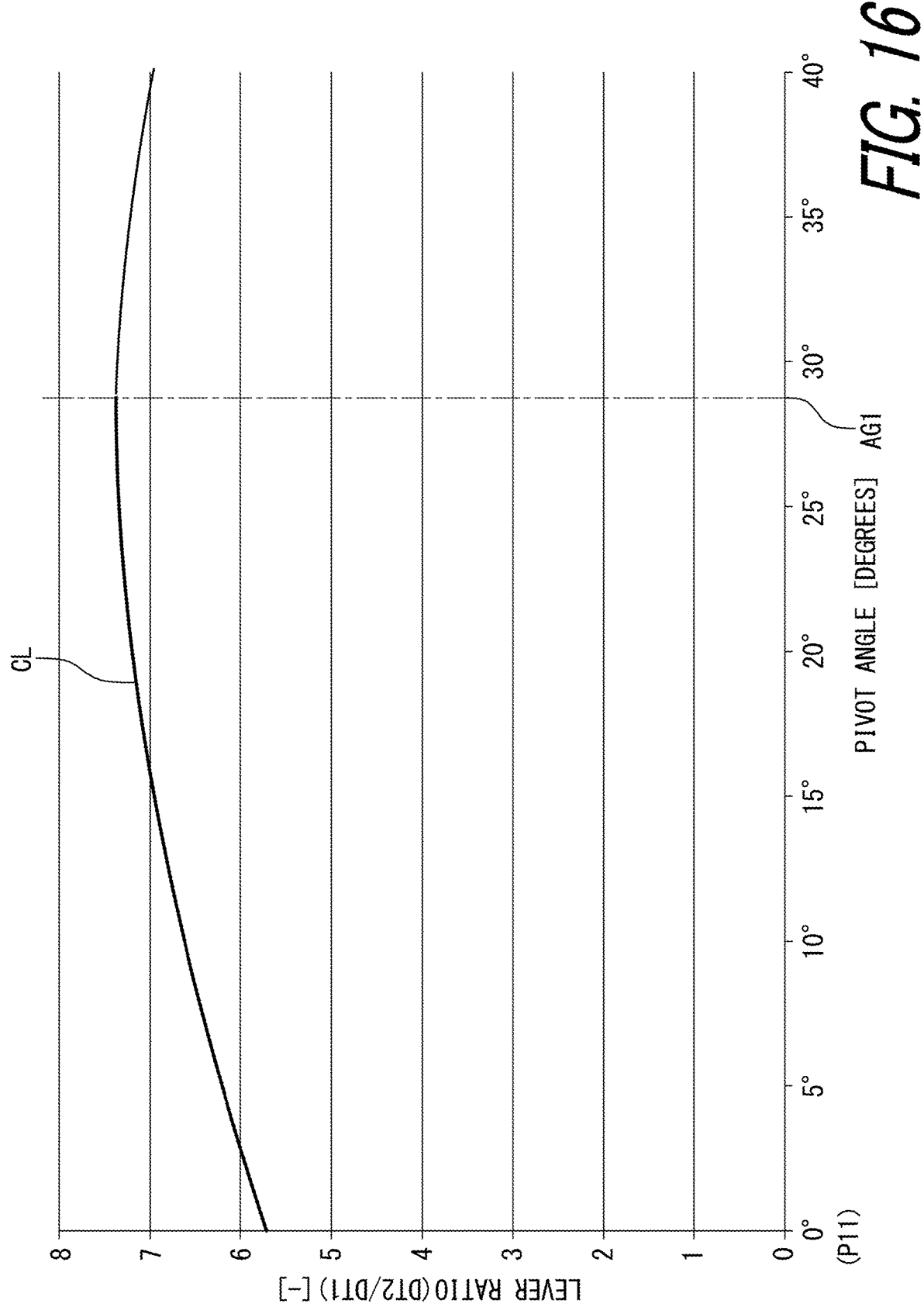
FIG. 16 is a graph showing a relationship between a pivot angle and a lever ratio of an operating member of the operating device illustrated in FIG. 1.

As seen in FIG. 2, a lever length DT2 is defined between pivot axis A1 and the distal end portion 14B. As seen in FIG. 16, a lever ratio of the lever length DT2 to the distance DT1 gradually increases while the operating member 14 is pivoted from the rest position P11 by a predetermined pivot angle AG1. The lever ratio is indicated with a curved line CL. A gradient of the curved line CL indicating the lever ratio is the largest in the rest state where the operating member 14 is in the rest position P11. The gradient of the curved line CL indicating the lever ratio gradually decreases to zero while the operating member 14 is pivoted from the rest position P11 by the predetermined pivot angle AG1. Thus, slave pistons of the operated device BC1 quickly approach a friction member in response to the pivotal movement of the operating member 14 at first, and then the slave pistons of the operated device BC1 slowly comes into contact with the friction member in response to the pivotal movement of the operating member 14. This can improve the response of the operated device BC1 with respect to the pivotal movement of the operating member 14.

The operating device 10 comprises the hydraulic unit 80. However, the operating member 14 can be operatively coupled to another structure instead of the hydraulic unit 80. For example, the operating member 14 can be operatively coupled to a mechanical control cable such as a Bowden cable so as to operate the operated device BC1.

Figure 17:
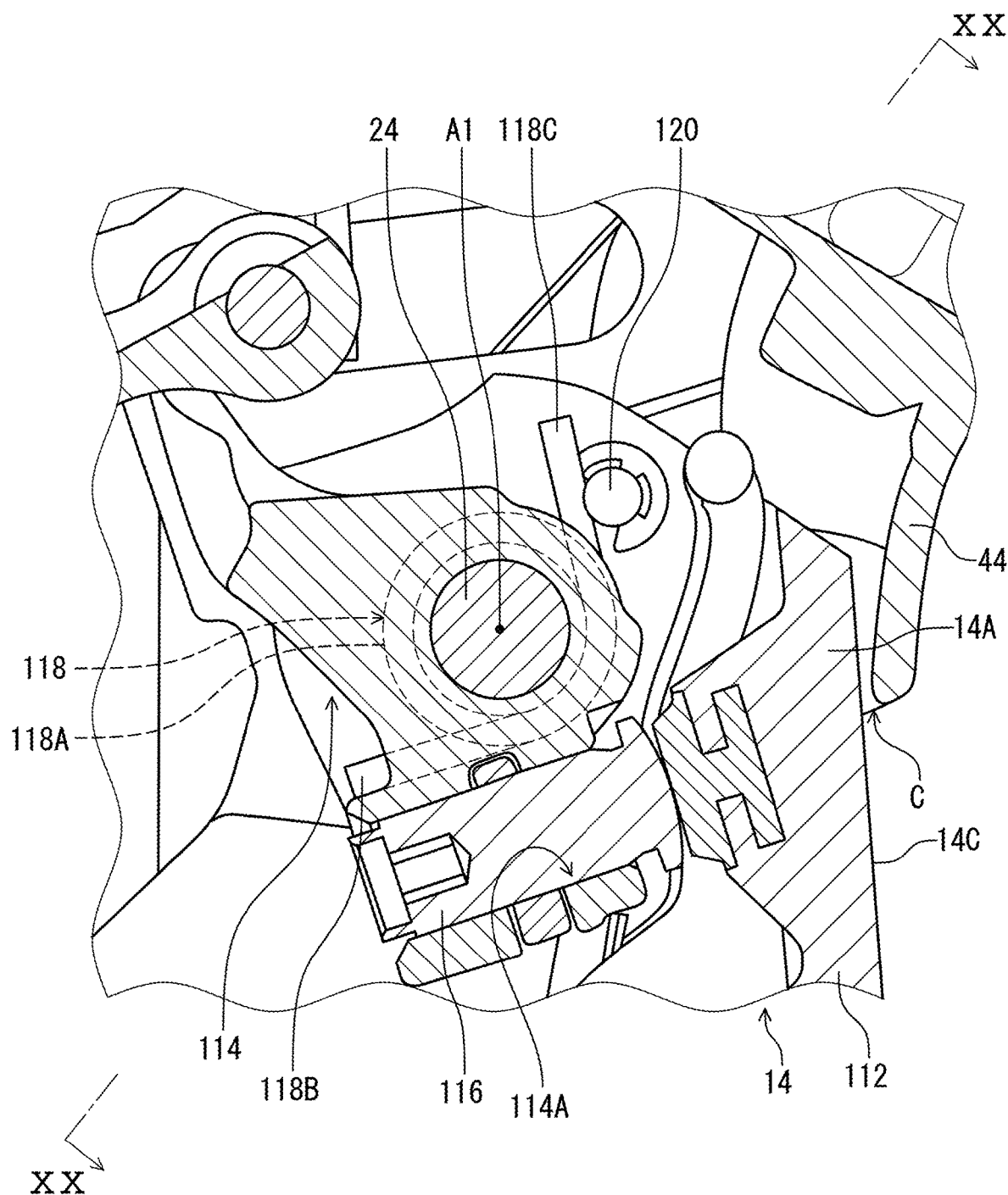
FIG. 17 is a partial cross-sectional view of the operating device taken along line XVII-XVII of FIG. 20.

As seen in FIG. 17, the operating member 14 includes a lever 112, an intermediate member 114, an adjustment member 116, a biasing member 118, and a support 120. The lever 112 includes the proximal end portion 14A, the distal end portion 14B (see, e.g., FIG. 2), and the outer surface 14C. The lever 112 is pivotally coupled to the base member 12 about the pivot axis A1. The intermediate member 114 is a separate member from the lever 112 and is pivotally coupled to the lever 112 about the pivot axis A1. The intermediate member 114 includes an adjustment threaded hole 114A. The adjustment member 116 is threadedly engaged with the adjustment threaded hole 114A and is contactable with the lever 112. Rotation of the adjustment member 116 changes a relative position between the lever 112 and the intermediate member 114 about the pivot axis A1.

The biasing member 118 is configured to bias the intermediate member 114 to maintain contact between the adjustment member 116 and the lever 112. The biasing member 118 includes a coiled body 118A, a first end 118B, and a second end 118C. The coiled body 118A is provided on the pivot shaft 24. The first end 118B extends from the coiled body 118A and is configured to be in contact with the intermediate member 114. The second end 118C extends from the coiled body 118A and is configured to be in contact with the support 120. The support 120 is secured to the lever 112.

Figure 18:
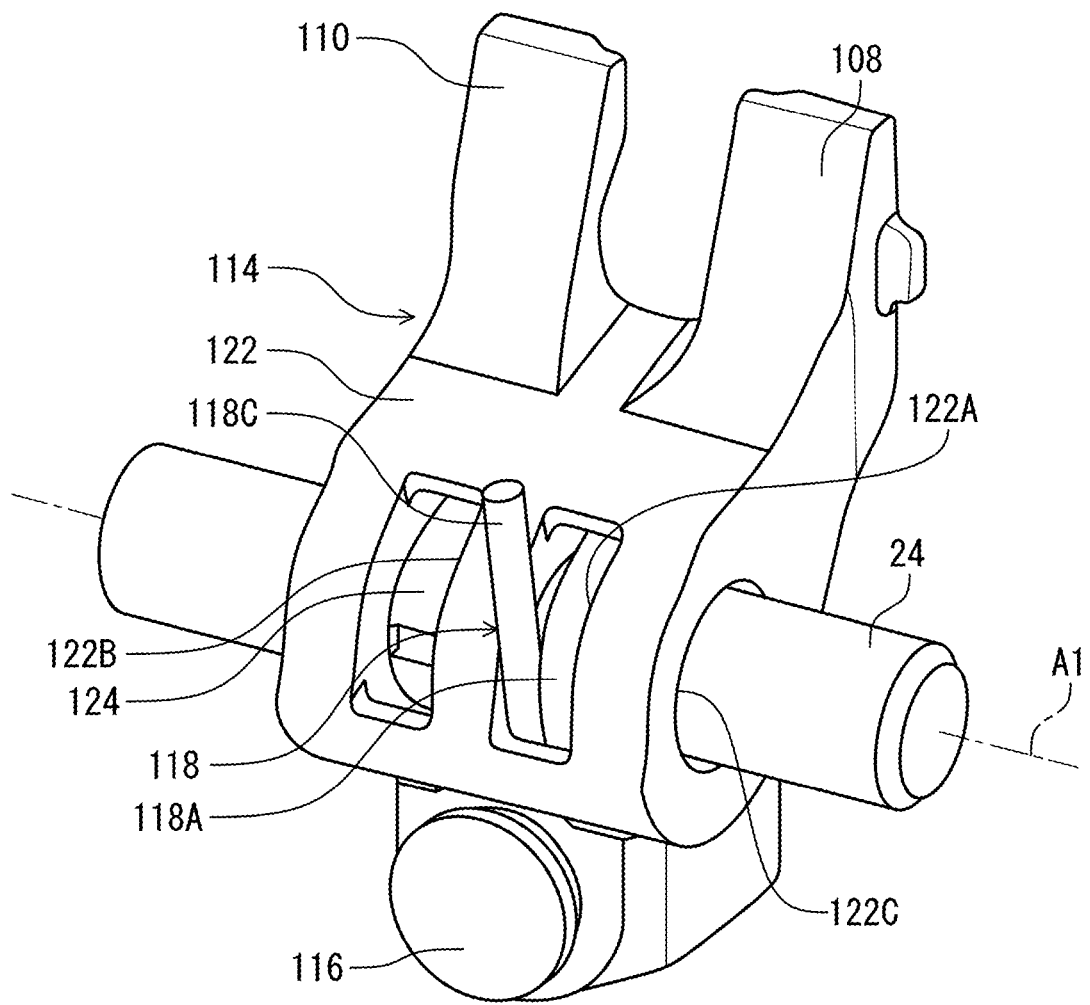
FIG. 18 is a perspective view of surrounding parts of a pivot shaft of the operating device illustrated in FIG. 1.
Figure 19:
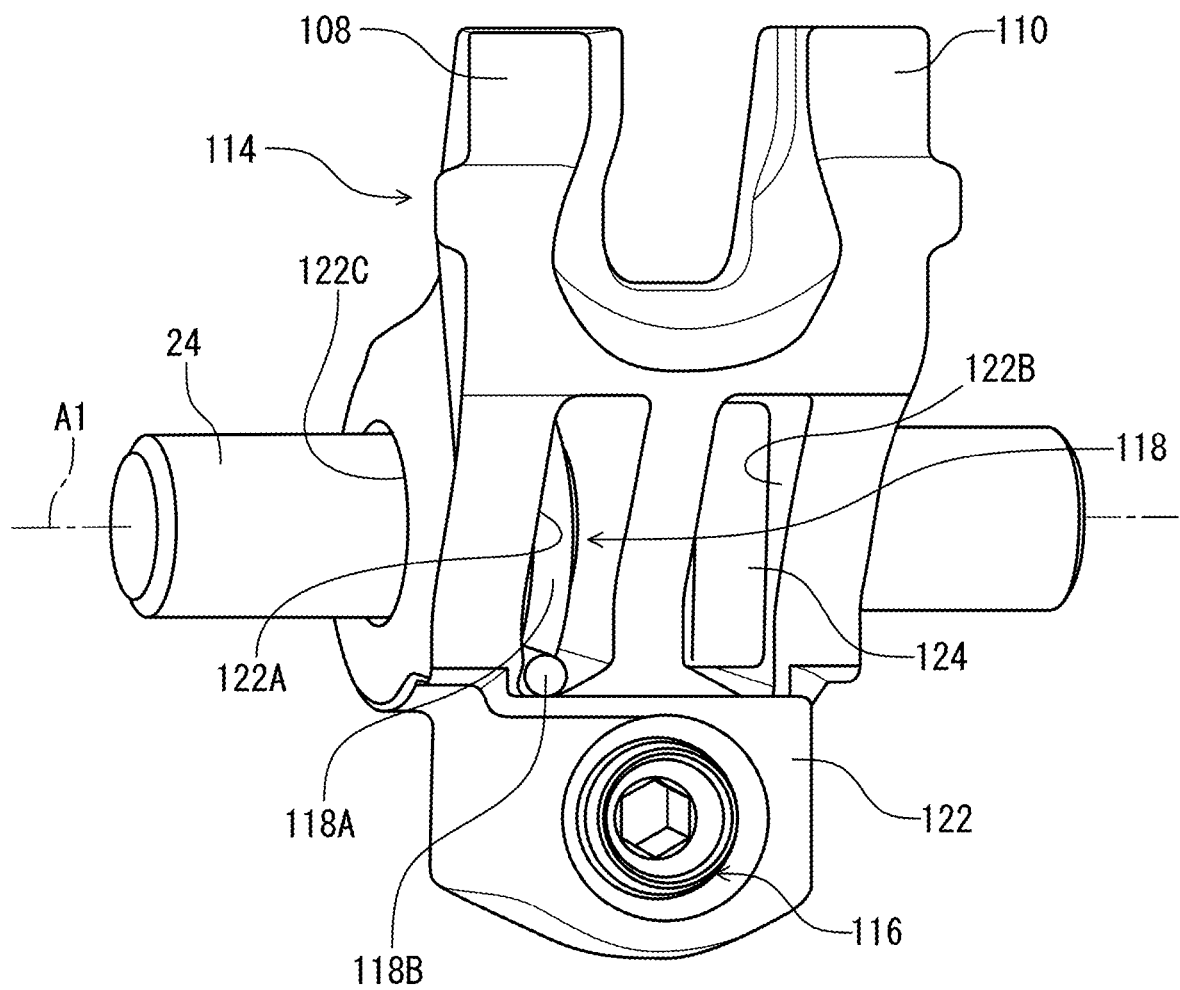
FIG. 19 is a perspective view of surrounding parts of a pivot shaft of the operating device illustrated in FIG. 1.

As seen in FIGS. 18 and 19, the intermediate member 114 includes the first transmitting part 108 and the second transmitting part 110. The intermediate member 114 includes an intermediate body 122. The first transmitting part 108 and the second transmitting part 110 protrude from the intermediate body 122. The intermediate body 122 includes a first opening 122A, a second opening 122B, and a through-hole 122C. The pivot shaft 24 extends through the through-hole 122C.

The biasing member 118 is provided in the first opening 122A. The coiled body 118A is provided in the first opening 122A. The first end 118B and the second end 118C protrude from the first opening 122A. The operating member 14 includes a positioning part 124. The positioning part 124 is provided in the second opening 122B.

Figure 20:
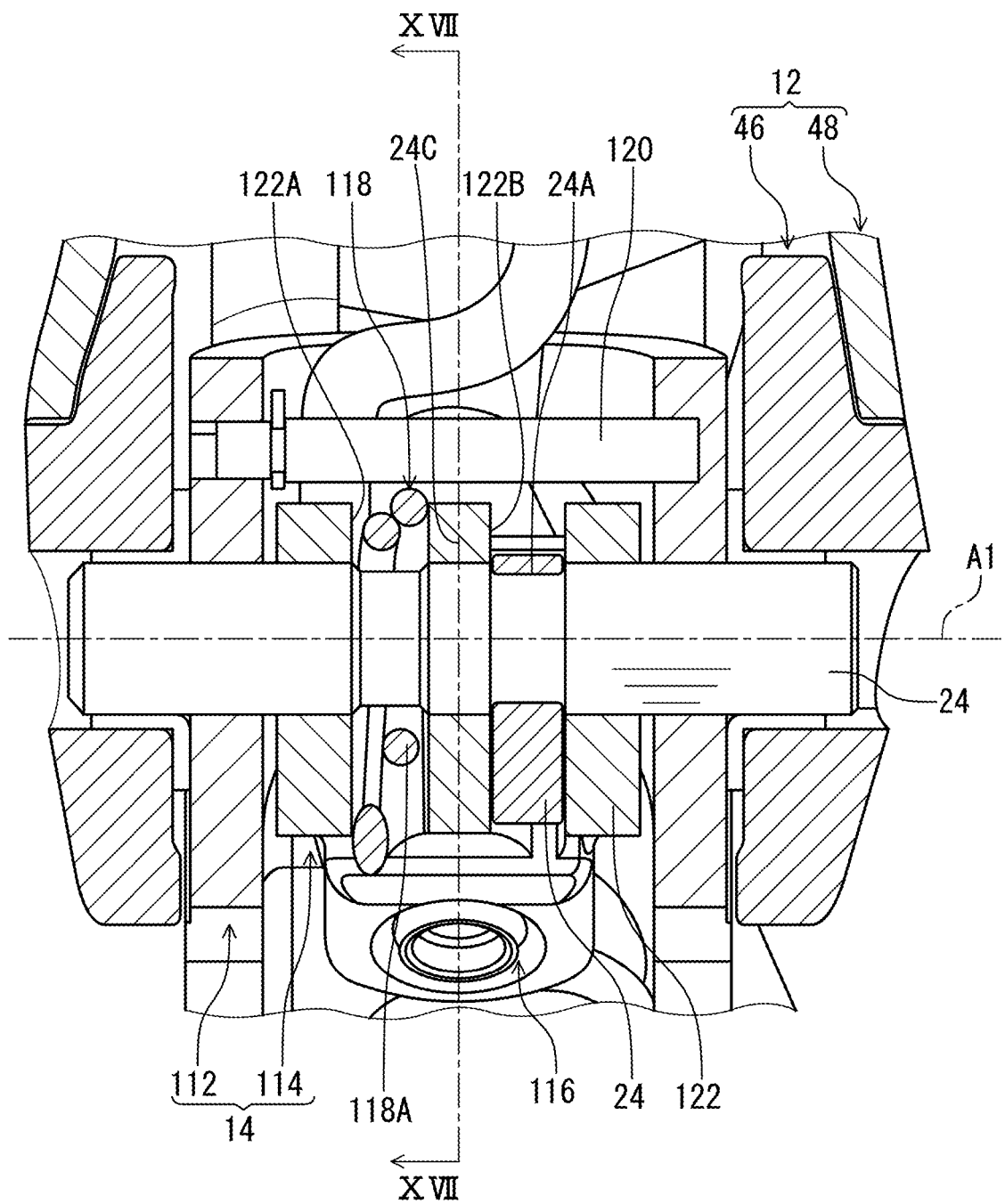
FIG. 20 is a partial cross-sectional view of the operating device taken along line XX-XX of FIG. 17.

As seen in FIG. 20, the pivot shaft 24 includes a positioning groove 24A. The positioning part 124 is fitted in the positioning groove 24B to restrict the intermediate member 114 from moving in the axial direction D4. The biasing member 118 is offset from an axial center 24C of the pivot shaft 24 in the axial direction D4. The first opening 122A and the second opening 122B are offset from the axial center of the pivot shaft 24 in the axial direction D4.

Figure 21:
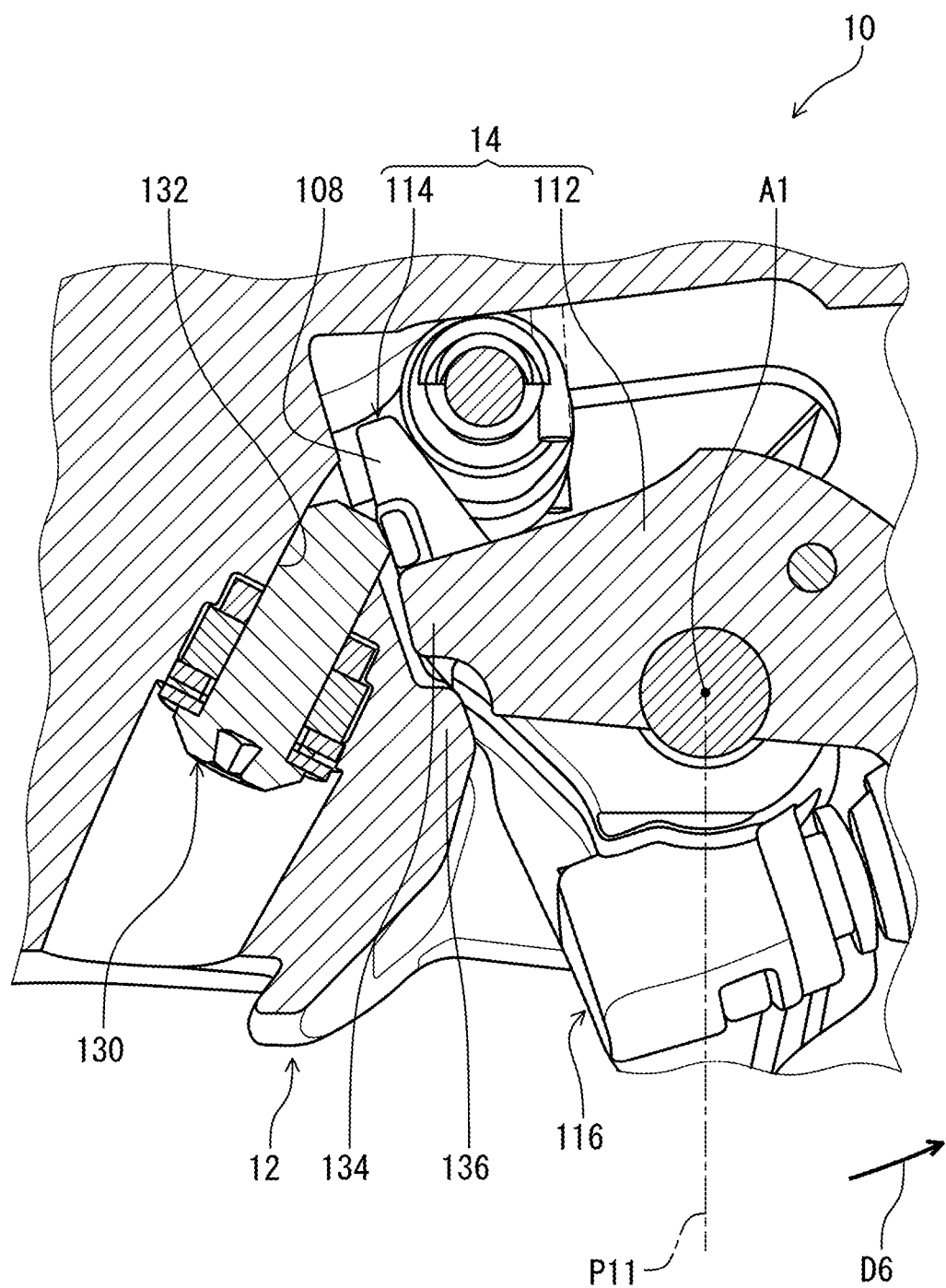
FIG. 21 is a partial cross-sectional view of the operating device illustrated in FIG.

As seen in FIG. 21, the operating device 10 includes an additional adjustment member 130 configured to be in contact with the operating member 14 to position the operating member 14 in the rest position P11. The base member 12 includes an additional adjustment threaded hole 132. The additional adjustment member 130 is threadedly engaged in the additional adjustment threaded hole 132. The operating member 14 is in the rest position P11 in a state where the operating member 14 (e.g., the intermediate member 114) is in contact with the additional adjustment member 130. As seen in FIG. 3, the piston 84 is in the initial position P21 in the state where the operating member 14 is in contact with the additional adjustment member 130 (see, e.g., FIG. 21).

As seen in FIG. 12, rotation of the additional adjustment member 130 changes the rest position P11 of the operating member 14 and the initial position P21 of the piston 84 relative to the base member 12. Rotation of the adjustment member 116 changes the rest position P11 of the operating member 14 without changing the initial position P21 of the piston 84 (see, e.g., FIG. 3).

As seen in FIG. 21, the lever 112 of the operating member 14 includes a first stopper 134. The base member 12 includes a second stopper 136. The first stopper 134 is contactable with the second stopper 136. When the operating member 14 is operated from the rest position P11 away from the operated position P12 in an opposite direction D6, the first stopper 134 and the second stopper 136 restrict the lever 112 from pivoting in the opposite direction D6 relative to the base member 12 and the intermediate member 114.

As seen in FIG. 1, the switch SW1 includes an additional operating member SW11 movably coupled to the operating member 14. The switch SW2 includes an additional operating member SW21 movably coupled to the operating member 14. The additional operating member SW11 is pivotally coupled to the operating member 14 about an additional pivot axis A7. The additional operating member SW21 is pivotally coupled to the operating member 14 about the additional pivot axis A7. The additional operating member SW11 is a separate member from the additional operating member SW21.

Figure 22:
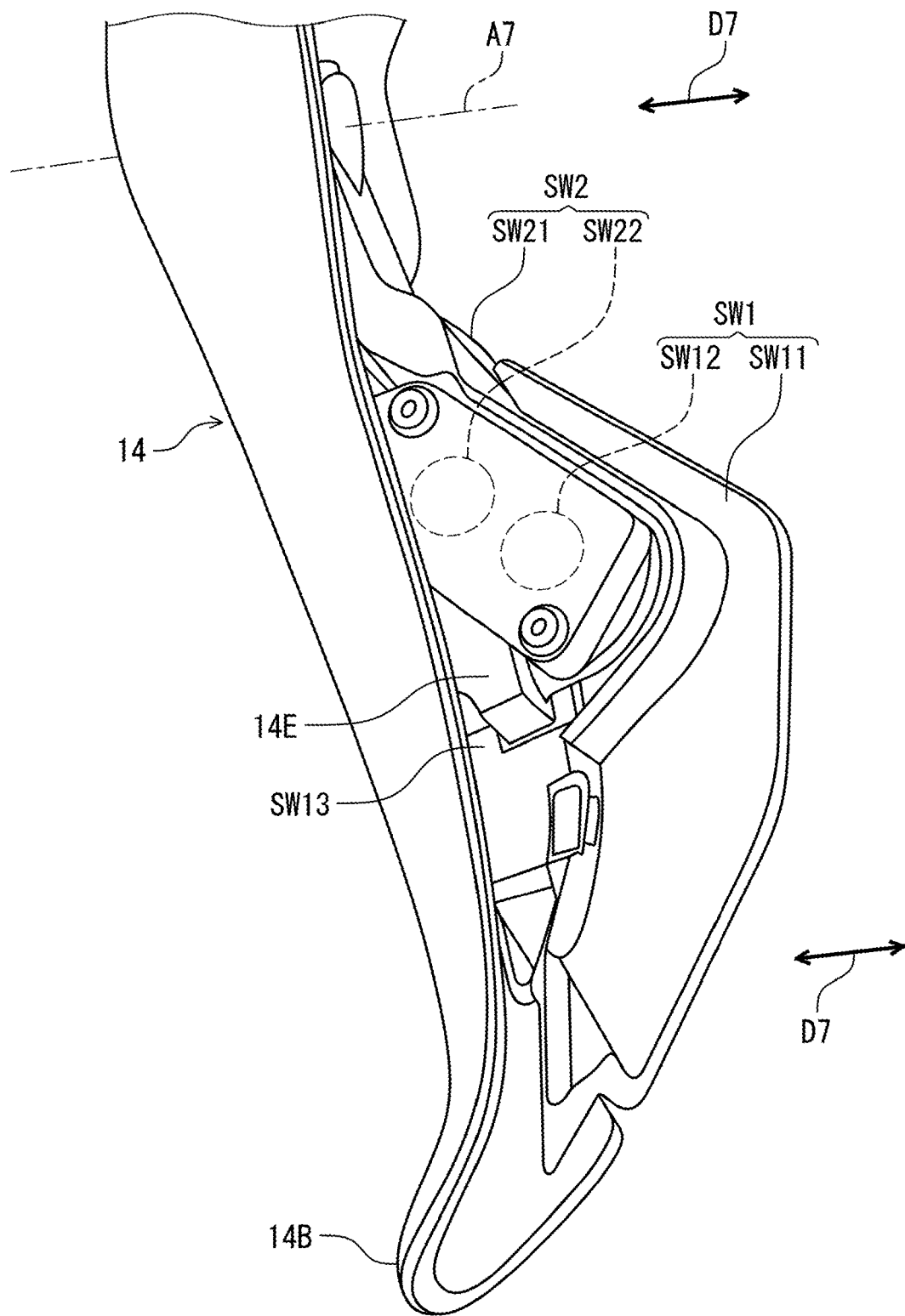
FIG. 22 is a perspective view of the operating member of the operating device illustrated in FIG. 1.

As seen in FIG. 22, the switch SW1 includes an electric contact SW12 mounted to the operating member 14. The electric contact SW12 is configured to be turned on in response to a movement of the additional operating member SW11 relative to the operating member 14. The switch SW2 includes an electric contact SW22 mounted to the operating member 14. The electric contact SW22 is configured to be turned on in response to a movement of the additional operating member SW21 relative to the operating member 14.

The operating member 14 includes a first engagement part 14E. The additional operating member SW11 includes a second engagement part SW13 configured to be contactable with the first engagement part 14E in a direction D7 defined along the additional pivot axis A7. The first engagement part 14E and the second engagement part SW13 allow the additional operating member SW11 to pivot relative to the operating member 14 about the additional pivot axis A7. The first engagement part 14E and the second engagement part SW13 restrict the additional operating member SW11 from move away from the operating member 14 in the direction D7. The first engagement part 14E is provided between the second engagement part SW13 and the electric contact SW12.

Figure 23:
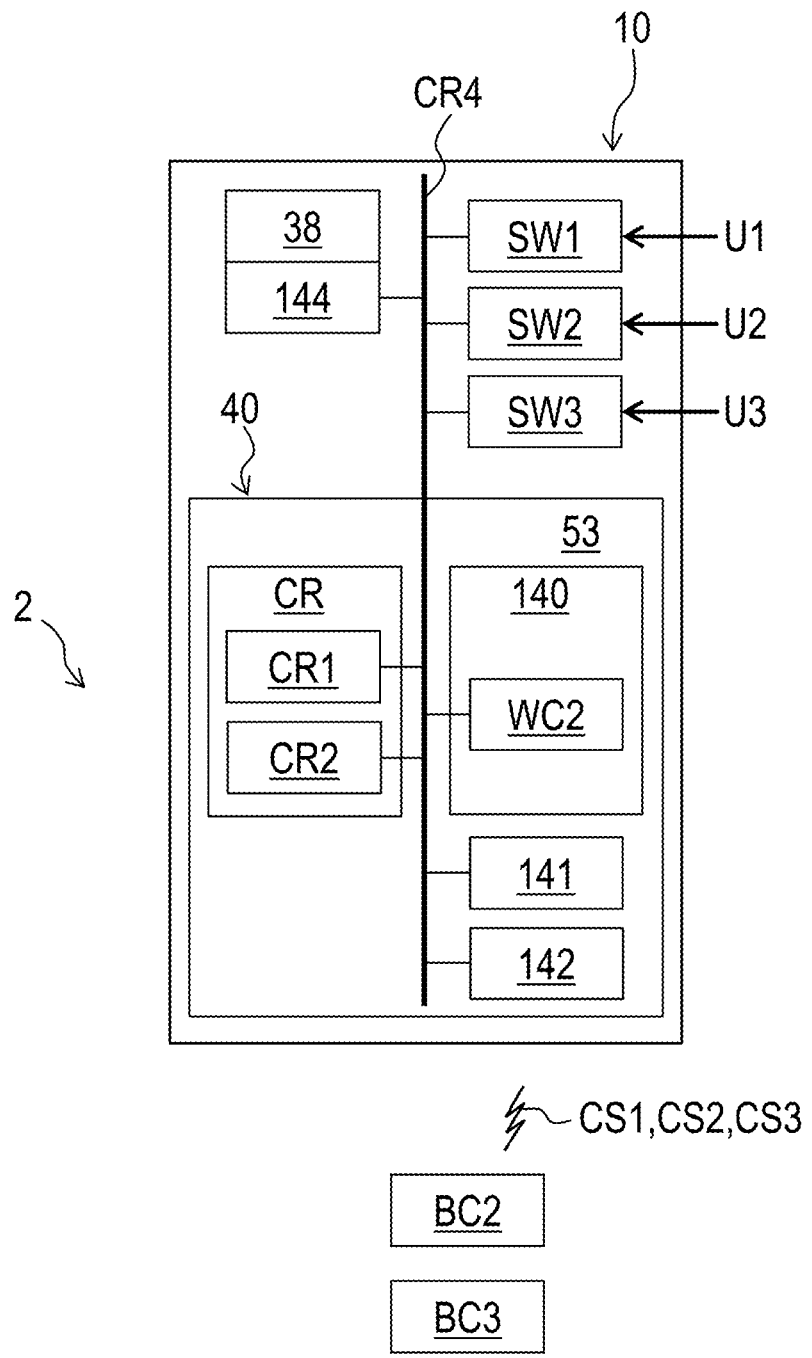
FIG. 23 is a block diagram of a human-powered vehicle including the operating device illustrated in FIG. 1.

As seen in FIG. 23, the circuitry 40 includes a communicator 140, an antenna 141, an informing unit 142, and a controller CR. The communicator 140, the antenna 141, the informing unit 142, and the controller CR are electrically mounted on the circuit board 53. The communicator 140, the antenna 141, the informing unit 142, and the controller CR are electrically connected with each other via the circuit board 53. The switches SW1, SW2, and SW3 are electrically connected to the controller CR. The power supply 40 is configured to be electrically connected to the communicator 140, the antenna 141, the informing unit 142, and the controller CR via the circuit board 53 and a power-supply holder 144.

The communicator 140 is configured to communicate with another device via at least one of a wired communication channel and a wireless communication channel. In the present embodiment, the communicator 140 includes a wireless communicator WC2. The wireless communicator WC2 is configured to communicate with a wireless communicator of the electric component BC2 using the antenna 141 via a wireless communication channel. The wireless communicator WC2 is configured to communicate with a wireless communicator of the additional electric component BC3 using the antenna 141 via a wireless communication channel. However, the communicator 140 can include a wired communicator configured to communicate with a wired communicator of the electric component BC2 via a wired communication channel.

The controller CR is configured to control another device in response to the user inputs U1 to U3 and/or other information. In the present embodiment, the controller CR is configured to control the wireless communicator WC2 to transmit a control signal CS1 and/or CS2 to the electric component BC2. The controller CR is configured to control the wireless communicator WC2 to transmit a control signal CS3 to the additional electric component BC3.

In the present embodiment, the control signal CS1 indicates upshifting of the electric component BC2. The control signal CS2 indicates downshifting of the electric component BC2. The control signal CS3 indicates that the state of the additional electric component BC3 is changed between the lock state and the adjustable state.

The controller CR includes a processor CR1, a memory CR2, and a system bus CR4. The processor CR1 and the memory CR2 are electrically mounted on the circuitry 40. The processor CR1 includes a central processing unit (CPU) and a memory controller. The processor CR1 is electrically connected to the memory CR2 with the circuitry 40 and the system bus CR4. The master wired communicator and the master wireless communicator are configured to be electrically mounted on the circuitry. The wireless communicator WC2 is electrically connected to the processor CR1 and the memory CR2 with the circuitry 40 and the system bus CR4.

The memory CR2 includes a read only memory (ROM) and a random-access memory (RAM). The memory CR2 includes storage areas each having an address in the ROM and the RAM. The processor CR1 is configured to control the memory CR2 to store data in the storage areas of the memory CR2 and reads data from the storage areas of the memory CR2. The memory CR2 (e.g., the ROM) stores a program. The program is read into the processor CR1, and thereby the configuration and/or algorithm of the communicator 140 is performed.

The wireless communicator WC2 includes a signal transmitting circuit and a signal receiving circuit. The wireless communicator WC2 is configured to superimpose digital signals on carrier wave using a predetermined wireless communication protocol to wirelessly transmit the digital signal. In the present embodiment, the wireless communicator WC2 is configured to encrypt signals using a cryptographic key to generate encrypted wireless signals.

The wireless communicator WC2 is configured to receive and/or transmit a wireless signal via the antenna 141. In the present embodiment, the wireless communicator WC2 is configured to decode the wireless signal to recognize signals and/or information wirelessly transmitted from another wireless communicator. The wireless communicator WC2 is configured to decrypt the wireless signal using the cryptographic key. The wireless communicator WC2 can also be referred to as a wireless communication circuit WC2.

The controller CR is configured to generate the control signal CS1 in response to the user input U1. The controller CR is configured to generate the control signal CS2 in response to the user input U2. The controller CR is configured to generate the control signal CS3 in response to the user input U3. The controller CR is configured to control the wireless communicator WC2 to respectively transmit the control signals CS1, CS2, and CS3 via the wireless communication channel in response to the user inputs U1, U2, and U3.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An operating device for a human-powered vehicle, comprising:
   a base member extending in a longitudinal direction, the base member including
      a first end portion configured to be coupled to a handlebar, and
      a second end portion opposite to the first end portion in the longitudinal direction, the second end portion including a cover portion provided on a reverse side of the first end portion in the longitudinal direction; and
   an operating member pivotally coupled to the base member about a pivot axis between a rest position and an operated position, the operating member including an outer surface configured to face away from the first end portion in a rest state where the operating member is in the rest position,
   the cover portion being configured to be arranged on a pivotal movement track of the operating member so as to at least partly overlap with the outer surface of the operating member in the rest state as viewed in the longitudinal direction,
   the operating member including a proximal end portion and a distal end portion opposite to the proximal end portion,
   the proximal end portion being closer to the pivot axis than the distal end portion,
   the cover portion including a lowermost end,
   the outer surface including an uppermost end,
   the lowermost end of the cover portion being closer to the distal end portion of the operating member than the uppermost end of the outer surface in the rest state,
   the base member including an upper surface and a lower surface,
   the upper surface defining an upper reference line extending along the longitudinal direction,
   the lower surface defining a lower reference line extending along the longitudinal direction,
   a first distance from the upper reference line to the lowermost end in a perpendicular direction perpendicular to the longitudinal direction being larger than a second distance from the lower reference line to the lowermost end in the perpendicular direction, the upper reference line being closer to the lower reference line in the perpendicular direction than a portion of the second end portion which is the farthest from the pivot axis in the perpendicular direction in the second end portion, and
   the cover portion being overlapped with the operating member and the pivot axis when viewed from the longitudinal direction, the pivot axis being disposed between the upper reference line and the lower reference line.

2. An operating device for a human-powered vehicle, comprising:

a base member extending in a longitudinal direction, the
  base member including
   a first end portion configured to be coupled to a
     handlebar, and
   a second end portion opposite to the first end portion in
     the longitudinal direction, the second end portion
     including a cover portion provided on a reverse side
     of the first end portion in the longitudinal direction;
an operating member pivotally coupled to the base member about a pivot axis between a rest position and an operated position, the operating member including an outer surface configured to face away from the first end portion in a rest state where the operating member is in the rest position, the first end portion being provided on a first side of the pivot axis in the longitudinal direction, the second end portion being provided on a second side of the pivot axis in the longitudinal direction, the second side being opposite to the first side with respect to the pivot axis in the longitudinal axis; and
circuitry provided on the second side of the pivot axis in the longitudinal direction,
the cover portion having a curved shape as viewed along the pivot axis, the cover portion being overlapped with the operating member and the pivot axis when viewed from the longitudinal direction.

3. The operating device according to claim 2, wherein the curved shape of the cover portion is concave toward the first end portion as viewed along the pivot axis.

4. The operating device according to claim 3, wherein the curved shape is configured to position a rider's finger.

5. An operating device for a human-powered vehicle, comprising:
  a base member extending in a longitudinal direction, the
    base member including
     a first end portion configured to be coupled to a
       handlebar, and
     a second end portion opposite to the first end portion in
       the longitudinal direction, the second end portion
       including a cover portion provided on a reverse side
       of the first end portion in the longitudinal direction;
  an operating member pivotally coupled to the base member about a pivot axis between a rest position and an operated position, the operating member including an outer surface configured to face away from the first end portion so as to at least partly overlap with the cover portion in a rest state where the operating member is in the rest position as viewed in the longitudinal direction, the first end portion being provided on a first side of the pivot axis in the longitudinal direction, the second end portion being provided on a second side of the pivot axis in the longitudinal direction, the second side being opposite to the first side with respect to the pivot axis in the longitudinal axis; and
  circuitry provided on the second side of the pivot axis in the longitudinal direction,
  the base member including
    a main body provided between the first end portion and the second end portion, and
    an attachment member to which the cover portion of the second end portion is provided,
  the attachment member being made of a first material different from the main body, and
  the cover portion being overlapped with the operating member and the pivot axis when viewed from the longitudinal direction.

6. The operating device according to claim 5, wherein the first material includes a glass fiber reinforced material.

7. The operating device according to claim 5, wherein the main body is made of a second material different from the first material.

8. The operating device according to claim 7, wherein the second material includes a carbon fiber reinforced material.

9. The operating device according to claim 1, wherein a clearance is provided between the base member and the outer surface of the operating member in the rest state.

10. The operating device according to claim 9, wherein the clearance is provided between the base member and the outer surface of the operating member in the longitudinal direction in the rest state such that the operating member is pivotally moved with respect to the base member between the rest position and the operated position.

11. The operating device according to claim 1, wherein the outer surface is provided between the pivot axis and the cover portion of the base member in the rest state.

12. The operating device according to claim 11, wherein the outer surface is provided between the pivot axis and the cover portion in the longitudinal direction in the rest state.

13. The operating device according to claim 1, wherein the lowermost end is closer to the distal end portion of the operating member than the pivot axis in the rest state in the perpendicular direction perpendicular to the longitudinal direction.

14. The operating device according to claim 1, wherein the second end portion includes a lateral surface and an additional lateral surface provided on a reverse side of the lateral surface in an axial direction of the pivot axis, and
the second end portion has an asymmetrical shape with respect to a transverse center plane of the second end portion, the transverse center plane being defined to bisect a transverse length defined between the lateral surface and the additional lateral surface.

15. An operating device for a human-powered vehicle, comprising:
  a base member extending in a longitudinal direction, the
    base member including
     a first end portion configured to be coupled to a
       handlebar, and
     a second end portion opposite to the first end portion in
       the longitudinal direction, the second end portion
       including a cover portion provided on a reverse side
       of the first end portion in the longitudinal direction;
    and
  an operating member pivotally coupled to the base member about a pivot axis between a rest position and an operated position, the operating member including an outer surface configured to face away from the first end portion in a rest state where the operating member is in the rest position,
  the cover portion being configured to be arranged on a pivotal movement track of the operating member so as to at least partly overlap with the outer surface of the operating member in the rest state as viewed in the longitudinal direction,
  the operating member including a proximal end portion and a distal end portion opposite to the proximal end portion,
  the proximal end portion being closer to the pivot axis than the distal end portion,
  the cover portion including a lowermost end,
  the outer surface including an uppermost end, the lowermost end of the cover portion being closer to the distal end portion of the operating member than the uppermost end of the outer surface in the rest state, the base member including an upper surface and a lower surface, the upper surface defining an upper reference line extending along the longitudinal direction, the lower surface defining a lower reference line extending along the longitudinal direction, a first distance from the upper reference line to the lowermost end in a perpendicular direction perpendicular to the longitudinal direction being larger than a second distance from the lower reference line to the lowermost end in the perpendicular direction, the second end portion including a lateral surface and an additional lateral surface provided on a reverse side of the lateral surface in an axial direction of the pivot axis, the second end portion having an asymmetrical shape with respect to a transverse center plane of the second end portion, the transverse center plane being defined to bisect a transverse length defined between the lateral surface and the additional lateral surface, and a transverse center of the lowermost end being offset from the transverse center plane of the second end portion toward one of the lateral surface and the additional lateral surface.

16. The operating device according to claim 15, wherein the transverse center of the lowermost end is closer to a handlebar center plane than the transverse center plane in a mounting state where the first end portion is coupled to the handlebar, and the handlebar center plane bisects a transverse length of the handlebar.

17. The operating device according to claim 1, wherein the second end portion includes a lateral surface and an additional lateral surface provided on a reverse side of the lateral surface in an axial direction of the pivot axis, and the second end portion has an asymmetrical shape with respect to a transverse center plane of the second end portion, the transverse center plane being defined to bisect a lateral length defined between the lateral surface and the additional lateral surface.

18. The operating device according to claim 1, wherein at least one of a power supply and circuitry is at least partly provided at the second end portion.

19. The operating device according to claim 1, wherein the upper reference line is defined on a surface of the upper surface which is arranged to be covered by a grip cover in a state where the grip cover is attached to the base member, and the lower reference line is defined on a surface of the lower surface which is arranged to be covered by the grip cover in the state where the grip cover is attached to the base member.

20. An operating device for a human-powered vehicle, comprising:

a base member extending in a longitudinal direction, the base member including
  a first end portion configured to be coupled to a handlebar, and
  a second end portion opposite to the first end portion in the longitudinal direction, the second end portion including a cover portion provided on a reverse side of the first end portion in the longitudinal direction;

an operating member pivotally coupled to the base member about a pivot axis between a rest position and an operated position, the operating member including an outer surface configured to face away from the first end portion in a rest state where the operating member is in the rest position, the first end portion being provided on a first side of the pivot axis in the longitudinal direction, the second end portion being provided on a second side of the pivot axis in the longitudinal direction, the second side being opposite to the first side with respect to the pivot axis in the longitudinal axis; and circuitry provided on the second side of the pivot axis in the longitudinal direction, the cover portion being configured to be arranged on a pivotal movement track of the operating member so as to at least partly overlap with the outer surface of the operating member in the rest state as viewed in the longitudinal direction, the cover portion being overlapped with the operating member and the pivot axis when viewed from the longitudinal direction.

* * * * *